United States Patent [19]
Knowles et al.

[11] Patent Number: 5,334,805
[45] Date of Patent: Aug. 2, 1994

[54] CONTROLLER FOR AN ACOUSTIC WAVE TOUCH PANEL

[75] Inventors: Terrence J. Knowles, Hanover Park; Del Ogren, Deerfield, both of Ill.

[73] Assignee: Carroll Touch, Round Rock, Tex.

[21] Appl. No.: 972,605

[22] Filed: Nov. 6, 1992

Related U.S. Application Data

[63] Continuation-in-part of Ser. No. 898,281, Jun. 15, 1992.

[51] Int. Cl.⁵ .............................................. G08C 21/00
[52] U.S. Cl. ...................................... 178/18; 345/177; 367/907
[58] Field of Search .................. 178/18, 19; 340/706, 340/712; 367/907; 375/10, 76; 73/599, 646; 395/177

[56] References Cited

U.S. PATENT DOCUMENTS

| | | | |
|---|---|---|---|
| 3,673,327 | 6/1972 | Johnson et al. | 178/18 |
| 3,860,874 | 1/1975 | Malone et al. | 375/76 |
| 3,883,831 | 5/1975 | Williamson et al. | 333/30 |
| 4,644,100 | 2/1987 | Brenner et al. | 178/18 |
| 4,746,914 | 5/1988 | Adler | 178/18 |
| 4,791,416 | 12/1988 | Adler | 178/18 |
| 4,880,665 | 11/1989 | Adler et al. | 427/126.3 |
| 5,072,427 | 10/1991 | Knowles | 178/18 |
| 5,177,327 | 1/1993 | Knowles | 178/18 |

OTHER PUBLICATIONS

IEEE (Electronics Letter), Dieulesaint et al, Oct. 30, 1991, Entire document.

Primary Examiner—Stephen Chin
Assistant Examiner—Paul Loomis
Attorney, Agent, or Firm—McAndrews, Held & Malloy, Ltd.

[57] ABSTRACT

A controller for an acoustic wave touch panel includes a signal conditioning circuit that can receive and process X axis and Y axis sense signals from the touch panel where the touch panel can be configured with either one or two transducers per sense axis. The signal conditioning circuit includes a differential amplifier to which simultaneously received X axis and Y axis sense signals are applied to provide common mode rejection. The controller also includes a touch position detector that accurately determines the position and pressure of a touch without jitter, the touch position detector including a software low pass filter and peak detector for analyzing the output of the signal conditioning circuit.

65 Claims, 14 Drawing Sheets

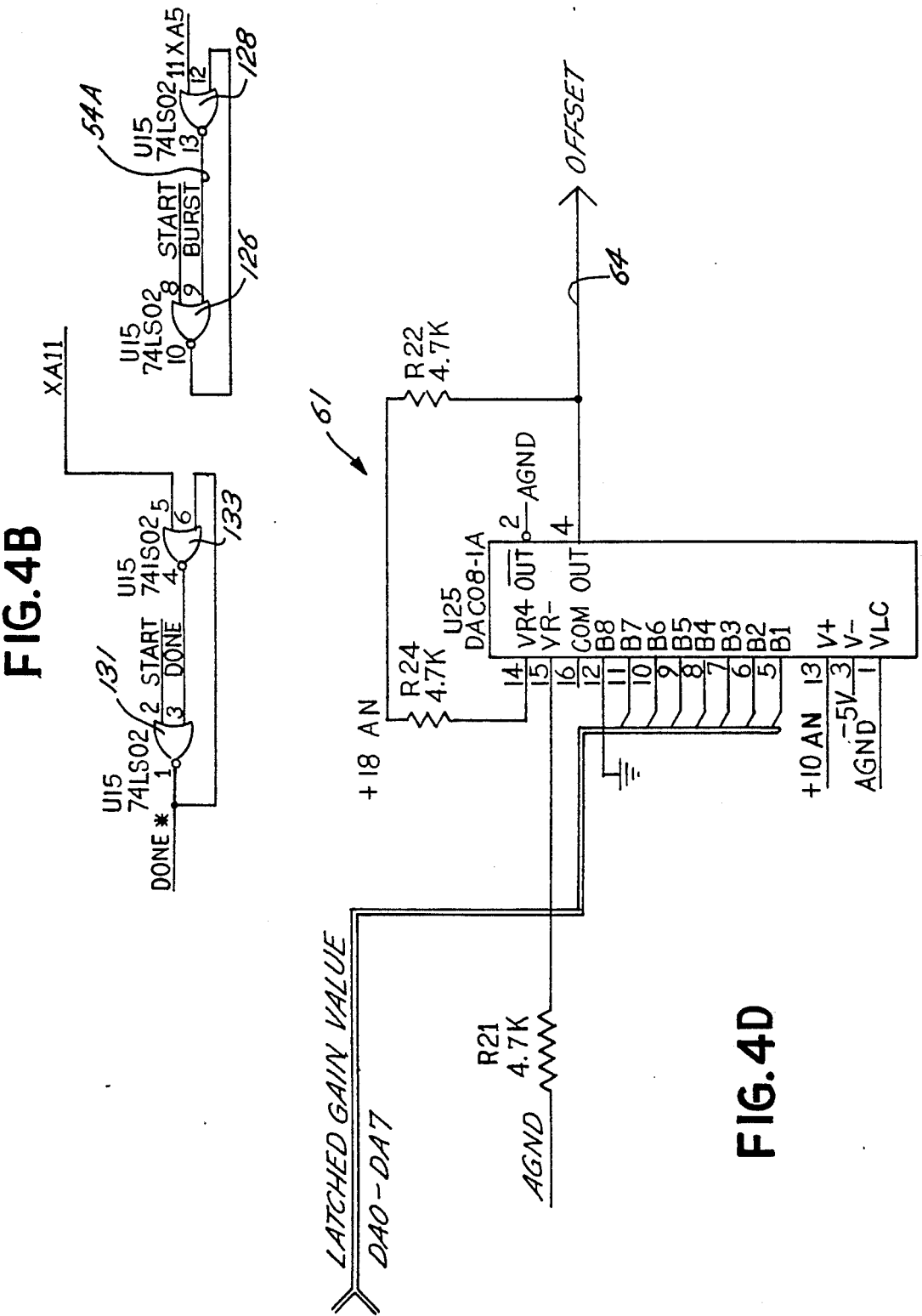

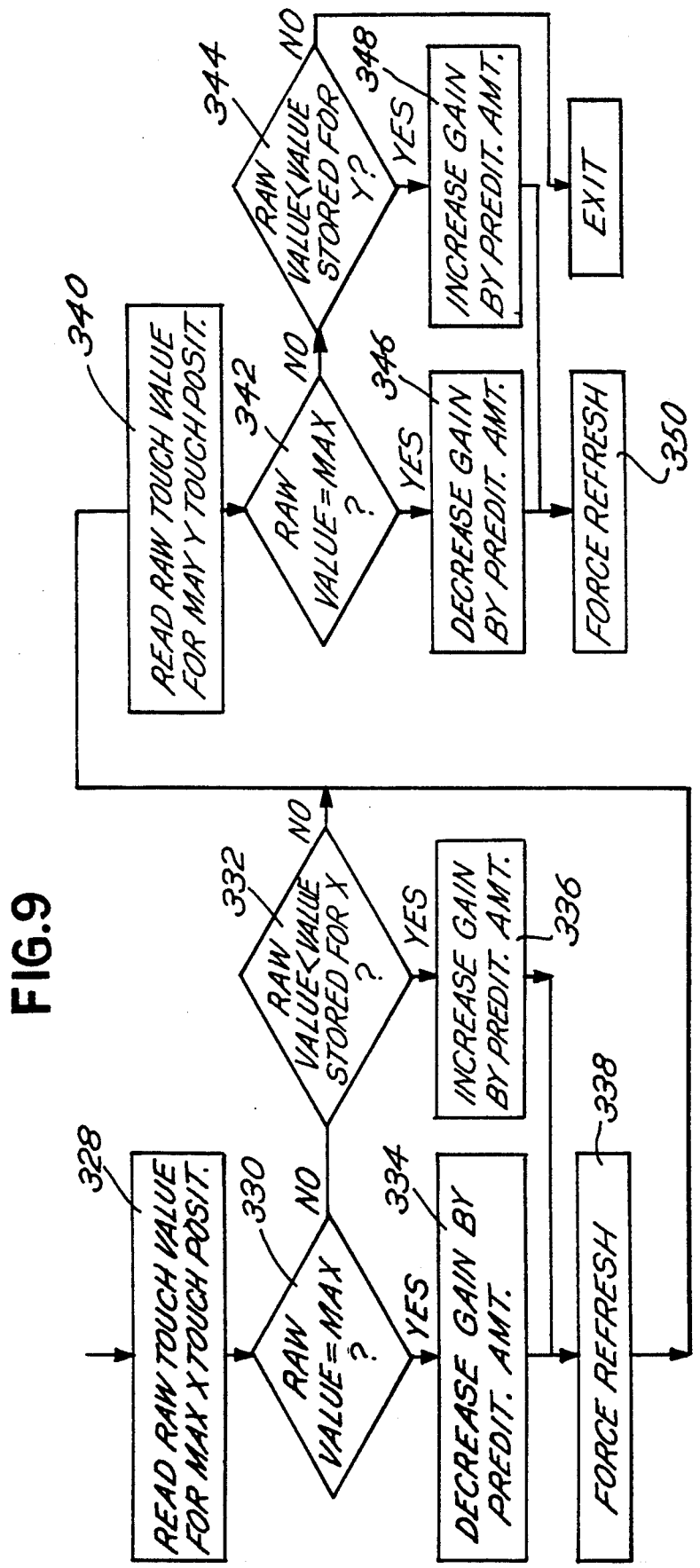

CONTROLLER FOR AN ACOUSTIC WAVE TOUCH PANEL

This is a continuation-in-part of U.S. patent application Ser. No. 07/898,281, filed Jun. 15, 1992.

TECHNICAL FIELD

The present invention is directed to a controller for an acoustic wave touch panel and more particularly to such a controller having a signal conditioning circuit for processing X and Y axis sense signals received from the touch panel utilizing common mode rejection and having a touch position detector and a touch pressure detector that are accurate and stable, the controller allowing the touch panel to be used in hostile environments.

BACKGROUND OF THE INVENTION

Known acoustic wave touch panels have included a substrate and X and Y axis transmitting transducers mounted thereon to impart acoustic waves for propagation in the substrate. The acoustic waves imparted into the substrate are reflected, by respective X and Y axis reflective arrays, along a number of substantially parallel paths that extend across a touch area of the substrate to second, respective X and Y axis reflective arrays. These latter arrays reflect the acoustic waves incident thereto to respective X and Y receiving transducers mounted on the substrate. Other known acoustic wave touch panels utilize only one transceiving transducer and one associated reflective array per axis. More particularly, each of these transducers functions to impart an acoustic wave into the substrate for reflection by an associated array along a number of substantially parallel paths across the touch surface of the panel to a reflective edge of the substrate or a reflective grating disposed therein. The reflective edge or grating reflects the acoustic waves incident thereto back across the touch surface of the panel to the associated reflective array which in turn reflects the waves back to the transducer for sensing.

Controllers are provide for these types of acoustic wave touch panels for generating drive signals to be applied to the X and Y axis transmitting transducers; for receiving and amplifying the X and Y axis sense signals from the transducers; and for determining the coordinate of a touch on the panel from the respective X and Y axis sense signals. Heretofore known touch panels have included gates, switches or the like disposed between the transducers and the amplifier stages of the controller to prevent signals from both the X and Y axis transducers from being simultaneously received. More particularly, these controllers operate to first apply a burst drive signal to one of the transmitting transducers, the X axis transducer for example. Then the controller controls the gate or switch to couple the signal received from only the X-axis transducer to an amplification stage. After the X-axis signal is processed, the controller applies a burst drive signal to the Y-axis transducer and thereafter switches the gate to couple the signal received from only the Y axis transducer to the amplification stage. The gate to prevent the X axis and Y axis transducer signals from being received simultaneously, was thought necessary to obtain signals from which touch coordinates could be obtained. This is because it was thought that when acoustic waves were imparted into the substrate from one axis, spurious waves would be picked up by the transducer associated with the other axis. It was thought that the spurious acoustic waves would result in transducer sense signals of sufficient magnitude to prevent the simultaneous receipt and processing of the X-axis and Y-axis signals. However, it has further been found that the position of the gate or switch with respect to the amplifier stage creates complications and problems with noise to make processing of the sense signals and recognition of a touch from the received sense signals difficult.

SUMMARY OF THE INVENTION

In accordance with the present invention, the disadvantages of prior controllers for acoustic wave touch panels as discussed above have been overcome. The controller of the present invention includes a signal conditioning circuit for processing X and Y axis sense signals received from the touch panel utilizing common mode rejection. The controller of the present invention also includes a touch position detector and a touch pressure detector that are accurate and stable, the controller allowing the touch panel to be used in hostile environments.

More particularly, the signal conditioning circuit of the present invention includes a burst generator that is coupled to the transducers of the touch panel to apply respective drive signals to the X-axis and Y-axis transmitting transducers, one at a time. The signal conditioning circuit simultaneously receives a sensed X-axis signal and a sensed Y-axis signal from the respective X-axis and Y-axis receiving transducers and applies the sense signals from both axes to a differential device. The differential device subtracts the sense signal associated with one axis from the sense signal associated with the other axis to provide a difference signal that corresponds to the sensed acoustic wave propagating relative to the axis associated with the one driven transducer to allow the position of a touch relative to that axis to be determined. The common mode rejection provided by the differential device substantially eliminates both noise from the circuitry and spurious acoustic waves in the touch panel that are picked up by both the X and Y axis receiving transducers of the touch panel.

The signal conditioning circuit also includes a resonant circuit that is disposed in both the X-axis and Y-axis circuit channels. More particularly, this resonant circuit in each channel is disposed between the channel's transceiver and the channel's means for receiving the sense signal from the transceiver where the resonant circuit forms a series resonant circuit through which the drive signal is applied to the transceiver during a drive signal generation mode of operation and the resonant circuit forming a parallel resonant circuit of high impedance during the sensed signal receipt mode of operation.

The controller of the present invention is suitable for use with touch panels utilizing four transducers, i.e. an X-axis transmitting transducer, X-axis receiving transducer, Y-axis transmitting transducer and Y-axis receiving transducer as well as touch panels utilizing only one transducer per axis, i.e. an X-axis transceiver type of transducer and a Y-axis transceiver type of transducer. It is also noted that the controller of the present invention is suitable for touch panels utilizing various types of acoustic waves including Shear waves, Surface or Rayleigh waves, Lamb waves, Love waves, etc.

The signal conditioning circuit of the controller of the present invention eliminates the need for a gate or switch prior to the amplification stage and provides X axis and Y axis signals that are relative free from common mode noise so as to enable the detection of a touch position from these signals to be accomplished accurately and easily.

The touch position detector of the present invention is responsive to the conditioned X axis and Y axis signals received from the signal conditioning circuit to determine the position of a touch relative to the X and Y axes in a manner that is extremely accurate. Further, the touch position detector provides a touch position that is very stable in that noise is prevented from causing the detected touch position to vary or jump about when the actual touched position has not changed.

More particularly, the touch position detector includes a comparator for comparing received X and Y axis signals to respective X and Y axis reference signals to provide signals representing the difference between the received X axis signal and the X axis reference signal and representing the difference between the received Y axis signal and the Y axis reference signal. A low pass filter filters the X axis difference signal and the Y axis difference signal and a peak detector detects the peak of each of the filtered signals wherein the peak of the filtered X axis signal represents the position of a touch relative to the X axis and the peak of the Y axis signal represents the position of a touch relative to the Y axis.

The touch position detector may be implemented in hardware or software. When implemented in software, the touch position detector preferably includes a means for converting the conditioned X axis signal to a number of discrete X axis magnitude values, each X axis value being associated with a position along the X axis. Similarly, the converting means converts the conditioned Y axis signal to a number of discrete Y axis magnitude values, each value being associated with a position along the Y axis. The comparator then compares each of a plurality of the X axis magnitude values to a respective reference X axis value associated with the same position along the X axis as the position of the X axis magnitude value. The comparator also compares each of a plurality of the Y axis magnitude values to a reference Y axis value associated with the same position along the Y axis as the position of the Y axis magnitude value. The low pass filter filters the X axis difference values by averaging the X axis difference values along a number of points within a given range of a maximum X axis difference value. The low pass filter similarly filters the Y axis difference values. The peak detector then differentiates each of the filtered X axis and Y axis signals to determine the peaks thereof. The peak detector may include a sum of differences filter.

The pressure detector of the present invention determines the pressure of a touch from the magnitudes of the maximum difference signal associated with the X axis and the maximum difference signal associated with the Y axis such that these difference signals are averaged to provide a value representative of touch pressure.

The controller of the present invention includes an automatic refresh feature wherein the reference values to which the respective X axis and Y axis signals are compared to determine difference values are automatically updated on a relatively periodic basis and also when a user defined number of touches has been detected. The controller of the present invention also includes an automatic gain control for adjusting an amplifier in the signal conditioning circuit based upon variations of a maximum X axis signal and a maximum Y axis signal for an untouched panel from respective maximum X axis and Y axis reference signals, wherein the need for a gain adjustment is checked on a substantially periodic basis.

Further, in accordance with the present invention, a user may define a number of parameters to configure the touch panel to a particular application and to a particular environment. More particularly, the user can divide an acoustic wave touch panel into active touch regions and inactive touch regions such that the controller will not respond to X axis and Y axis sense signals indicating a touch in the inactive region of the touch panel. Both the size and the position of the active touch region are variable and definable by the user. Further, the origin, i.e. the (0,0) position, of the X and Y axes relative to which coordinates of a touch position are determined may be defined by a user as one of four corner positions on the touch panel. The user can also define the threshold for a touch such that touches having a magnitude less than the user defined threshold will not be detected. In order to prevent or minimize jitter of a detected touch position in a particular environment, the user is allowed to define a guard band for each of the X and Y axes such that a new touch position will be acknowledged only when the new touch position is at a distance from a previous touch position that is greater than a predetermined amount representative of the user defined guard band. The guard band also allows the user to set the resolution of the touch panel in, for example, 1/80th inch increments.

These and other objects and advantages of the present invention as well as details of an illustrated embodiment will be understood from the following description and the drawing.

BRIEF DESCRIPTION OF THE DRAWING

FIGS. 4A-E form a schematic diagram of the controller circuitry utilized with the signal conditioning circuit;

FIG. 9 is a flow chart illustrating an AGC routine for the controller of the present invention.

DETAILED DESCRIPTION OF THE PREFERRED EMBODIMENT

Figure 1:
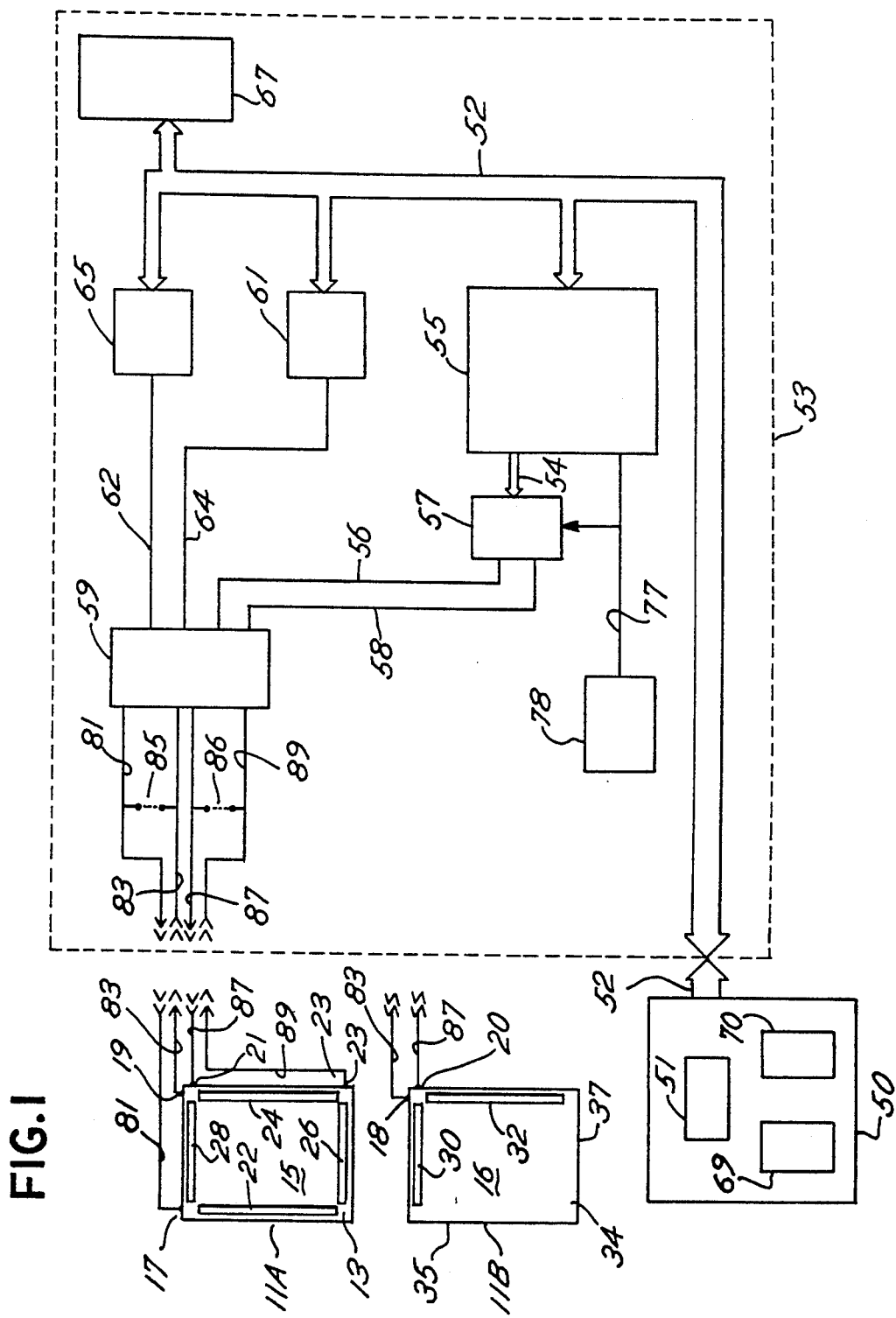
FIG. 1 is a block diagram of the controller of the present invention illustrated with a pair of acoustic wave touch panels.

The controller of the present invention, as shown in FIG. 1, includes a controller card 53 and a host computer 50 that is programmed to operate in accordance with the flow charts of FIGS. 6-9. The controller card interfaces between the host computer 50 and an acoustic wave touch panel 11A or 11B having either four transducers or two transducers respectively. More particularly, the acoustic wave touch panel 11A includes a substrate 13 on which is mounted a transmitting transducer 17 for imparting an acoustic wave into the substrate 13 along an axis of a reflective array 22. The reflective array 22 reflects the imparted acoustic wave along a number of substantially parallel paths across a touch surface 15 of the touch panel to a second reflective array 14. The second reflective array reflects the acoustic waves incident thereto to an X-axis receiving transducer 19. Similarly, the substrate 13 includes a Y-axis transmitting transducer 23 that imparts an acoustic wave into the substrate 13 along the axis of an array 26. The array 26 reflects the acoustic wave along a number of substantially parallel paths across the touch surface 15 to a reflective array 28. The reflective array 28 reflects the acoustic waves incident thereto to a Y-axis receiving transducer 21. The acoustic waves propagating in the substrate 13 are such that a touch on a touch surface of the panel causes a perturbation in the acoustic waves intersecting the touch wherein the perturbation can be detected by the controller 53 so as to determine the X-axis and Y-axis coordinates of the touch. It is noted that the transducers may be mounted on the substrate 13 to impart various types of acoustic waves for propagation in the touch panel substrate including Shear waves, Surface Acoustic waves or Rayleigh waves, Lamb waves, Love waves, etc. Suitable Shear wave acoustic touch panels and Lamb wave acoustic touch panels are shown in U.S. Pat. No. 5,072,427; in U.S. patent application Ser. No. 07/615,030 filed Nov. 16, 1990, entitled "Acoustic Touch Position Sensor", and in U.S. patent application Ser. No. 07/614,860 filed Nov. 16, 1990, each of which is assigned to the assignee of the present invention and incorporated herein by reference.

The acoustic wave touch panel 11B is similar to the panel 11A except that only two transducers 18 and 20 are utilized. The transducer 18 is an X-axis transceiver that imparts an acoustic wave into the substrate for propagation along an axis of a reflective array 32. The reflective array 32 reflects the acoustic wave along a number of substantially parallel paths extending across the touch surface 16 of the substrate 34 to a reflective edge 35 of the substrate or to a reflective grating, not shown, disposed in or on the substrate where the grating is capable of reflecting the particular type of acoustic wave utilized. The reflective edge 35 or grating reflects the acoustic waves incident thereto back along the parallel paths to the array 32. The reflective array 32 then reflects the acoustic waves propagating incident thereto back to the X-axis transceiver 18 to provide an X-axis sense signal. Similarly, a Y-axis transceiver 20 is mounted on the substrate 34 to impart an acoustic wave into the substrate 34 for propagation along an axis of a reflective array 30. The reflective array 30 reflects the acoustic wave along a number of substantially parallel paths extending across the touch surface 16 of the substrate 34 to a reflective edge 37 or reflective grating (not shown) for reflection back along the parallel paths to the array 30. The reflective array 30 then reflects the acoustic waves incident thereto back to the Y-axis transceiver which generates a Y-axis sense signal in response thereto. It is noted that, as discussed above with respect to the touch panel 11A, the touch panel 11B may utilize transducers 18 and 20 mounted on the substrate 34 to impart various types of acoustic waves therein including Shear waves, Surface or Rayleigh waves, Lamb waves, etc.

The acoustic wave touch position panel 11A, 11B coupled to the controller card 53 is driven by the controller card 53 under the control of the host computer 50 which communicates with the controller card 53 via a bus 52. Although the controller card 53 plugs into an expansion slot such is found in most personal computers, it may also be incorporated as part of the host computer circuitry. The host computer 50 includes a microprocessor 51 which operates in accordance with software stored in a ROM 69 and RAM 70, the RAM 70 also being used as a scratch pad memory for data.

The controller card 53 is responsive to a command from the host computer to initiate an X-axis cycle by applying a burst drive signal to the X axis transducer. The controller card thereafter senses, amplifies, demodulates and converts to a digital format the X axis signal for the host computer. Next, the host computer 50 retrieves the X axis signal from the controller card 53. After an X-axis cycle has been completed the controller card 53 in response to a command from the host computer 50 initiates a Y axis cycle by applying a burst drive signal to the Y axis transducer. The controller card thereafter senses, amplifies, demodulates and converts to a digital format the Y axis signal for the host computer 50. From the X and Y digital data representing the X axis and Y axis sensed signals from the respective transducers, the host computer 50 calculates the X and Y coordinate positions of a touch on the touch panel 11A, 11B.

More particularly, in response to an X channel reading request (or scan cycle request) from the host computer 50, a sub-controller 55 generates an X channel select signal and a burst enable signal along a bus 54 to a burst generator 57. In response to the burst enable signal, using a clock signal produced by a clock oscillator 78 on a conductor 77, the burst generator 57 produces a burst drive signal on an X-burst conductor 56. The burst drive signal is a series of digital pulses having a fifty (50) percent duty cycle at 5 megahertz ("MHz"). After thirty two (32) digital pulses (or cycles) have been generated, the controller card 55 removes the burst enable signal from the bus 54. The burst generator 57 responds by removing the burst drive signal from the conductor 56.

A signal conditioning circuit 59 receives and amplifies the burst drive signal prior to application to the touch panel 11A, 11B to generate the X channel acoustic waves. If the four-transducer touch panel 11A is used, jumpers 85 and 86 are removed so that the circuit 59 applies the amplified burst drive signal to the X-channel transmitting transducer 17 via the conductor 81. The transducer 17 responds by generating the X-channel acoustic wave. If, however, the two-transducer touch panel 11B is used, the jumper 85 is inserted into the circuit to electrically connect the conductors 81 and 83 and the jumper 86 is inserted to connect the conductors 87 and 89. In this case the circuit 59 applies the amplified burst drive signal to the X-channel transceiving transducer 18 via the pathway defined by the conductor 81, jumper 85, and conductor 83. In response to the burst drive signal, the transducer 18 generates the X-channel acoustic wave.

Thereafter, either the X-channel receiver transducer 19 or X-channel transceiving transducer 18 senses the reflected acoustic wave and produces the X-axis signal on the conductor 83. The signal conditioning circuit 59 receives and processes the X-axis signal by amplifying, filtering and demodulating the signal before transmitting the processed X-axis signal along a conductor 62 to an analog-to-digital ("A/D") converter 65. Most importantly, the circuit 59 receives and processes the X-axis and the Y-axis sense signals simultaneously even though only an X-axis signal is expected. The Y-axis sense signal is effectively subtracted from the X-axis sense signal using common mode rejection techniques. Both inherent circuit noise and spurious vibrations common to both channels including spurious acoustic waves sensed by both the X and Y receiving transducers are thereby removed. This common mode rejection also occurs when the Y-axis sense signal is expected, by effectively subtracting the X-axis sense signal. Using common mode rejection techniques, the desirable channel signal is selected, enhancing the detectability of the touch. It is noted that because common mode rejection techniques are utilized, the receiving transducers 19 and 21 of the panel 11A or the transceivers 18 and 20 of the panel 11B should be mounted on the touch panel as close as possible and preferably equidistant to a diagonal extending between the transducers and at a 45° angle with respect to the X and Y axes. Further the circuitry associated with the X-axis and Y-axis channels should be symmetrical and in close proximity as will be apparent to one of ordinary skill in the art.

The X-axis sense signal is further processed to remove the alternating component therefrom, providing an envelope waveform. The A/D converter 65 receives, samples and converts the processed X-axis sense signal into a digital form, the digital data representing the X-axis sense signal being stored in a RAM 67. The sampling and conversion time of the A/D converter 65 is very short as compared to the 5 MHz burst rate so as to adequately represent the processed X signal in a digital form.

After the circuit 59 receives and processes the X-axis signal, the controller 53 repeats this process for the Y channel. In particular, the burst generator 57 produces a burst drive signal on a Y-burst conductor 58. The circuit 59 receives and amplifies the Y-burst drive signal and applies the burst drive signal to the touch panel 11A, 11B to generate the Y-axis acoustic waves. When the panel 11A is used, the circuit 59 applies the amplified burst drive signal to the Y-channel transmitter transducer 21 via the conductor 87. When the panel 11B is used, the circuit 59 applies the amplified burst drive signal to the Y-channel transceiving transducer 20 via the conductor 87. Thereafter either the Y-channel receiver transducer 23 or Y-channel transceiving transducer 20 senses the acoustic waves incident thereto and produces the Y-axis signal upon the conductor 89 either directly or via the conductor 87 and jumper 86. The circuit 59 processes the Y-axis sense signal, which includes rejecting the common mode X-axis sense signal, and transmits the processed Y-axis sense signal to A/D converter 65. The A/D converter 65 receives, samples and converts the processed Y-axis sense signal into a digital form, the digital data representing the Y-axis sense signal being stored in the RAM 67.

After the X and Y signals have been stored, the host computer 50 retrieves the signals in order to determine a position of a touch as described in detail below. It is noted that even though the RAMS 67 and 70 are separately located, the RAM 67 can be combined as part of the RAM 70 such that the controller 55 may directly store to the RAM 70, removing the need to transfer data between the two memories.

The host computer 50 monitors the level of the X and Y signals received from the storage RAM 67, and responds by adjusting the gain of the amplifier portion of the circuit 59 whenever necessary to optimize the detection of the perturbations. Although the "gain" to be adjusted may be the gain associated with the burst drive signal, in the preferred embodiment, it is the gain associated with the amplification of the sensed acoustic wave. Particularly, the host computer 50 transmits a digital gain signal representing a specific gain level to a digital-to-analog ("D/A") converter 61 via the bus 52. The D/A converter 61 responds by converting the digital gain signal into an analog form and applying the analog signal to the circuit 59 via a conductor 64, setting the gain of the X and Y sense amplification. Details of the gain adjustment process are described below.

Figure 2:
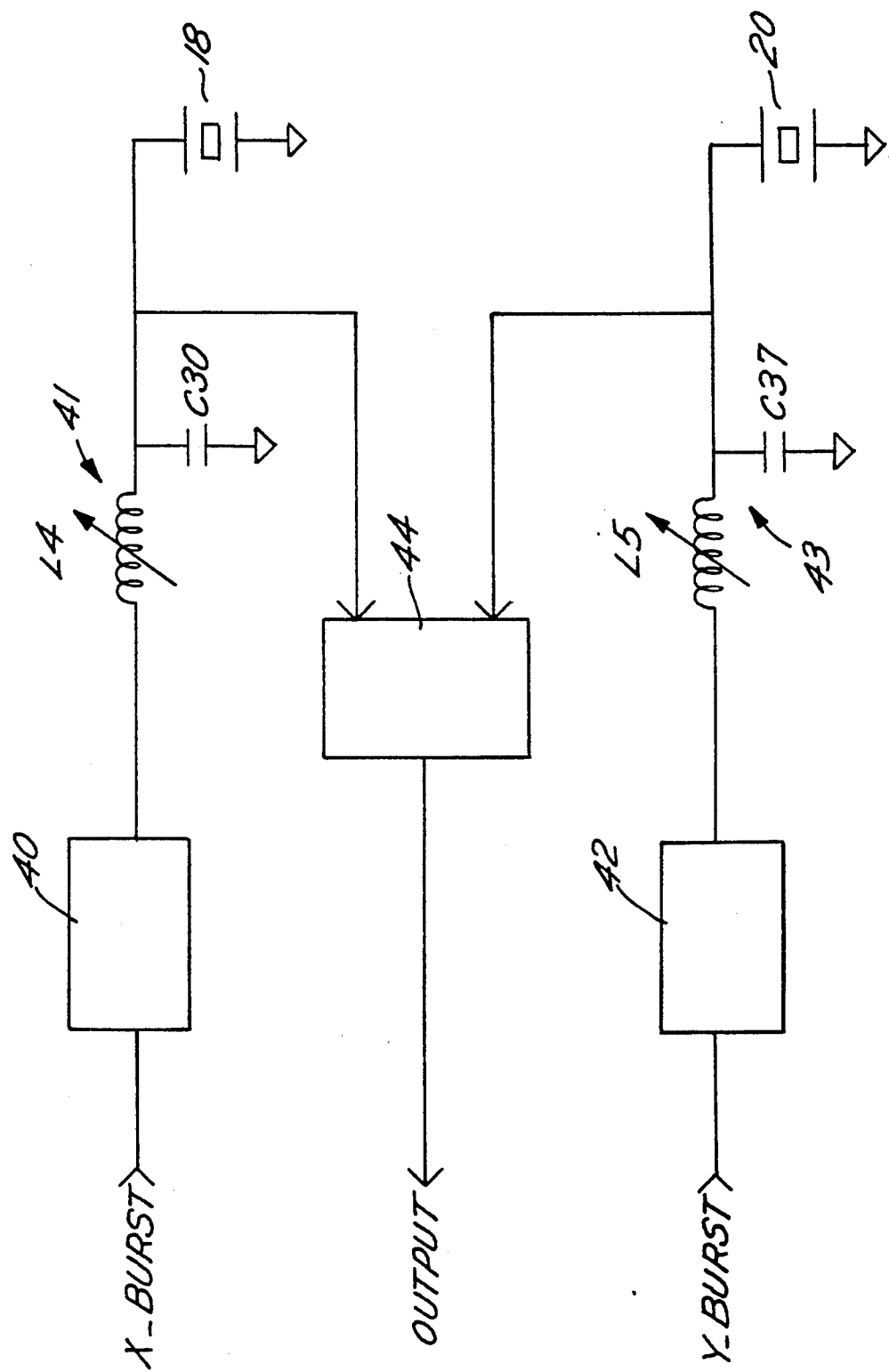
FIG. 2 is a block diagram of the signal conditioning circuit in accordance with the present invention as shown in FIG. 1.

The signal conditioning circuit 59 is illustrated in block diagram form in FIG. 2. The circuit 59 includes a resonant circuit 41 in the X channel and a resonant circuit 43 in the Y channel. The resonant circuit 41 includes an inductor L4 and a capacitor C30 whereas the resonant circuit 43 includes an inductor L5 and a capacitor C37 as described in detail below. The X-axis burst signal from the burst generator is applied to the switching circuit 40 which is controlled to toggle between the power supply voltage and ground to apply a burst signal to the resonant circuit 41 which forms a series resonant circuit through which the X-axis burst signal is applied to the transceiver 18 of the panel 11B. When the circuit is to receive the X-axis sense signal, however, from the transceiver 18, the switching circuit 40 ties the output thereof to ground so that the resonant circuit 41 forms a high impedance parallel resonant circuit for the incoming X-axis sense signal.

Similarly, the Y-axis burst signal from the burst generator is applied to the switching circuit 42 which is controlled to toggle between the power supply voltage and ground to apply a burst signal to the resonant circuit 43 which forms a series resonant circuit through which the Y-axis burst signal is applied to the transceiver 18 of the panel 11B. When the circuit is to receive the Y-axis sense signal, however, from the transceiver 20, the switching circuit 42 ties the output thereof to ground so that the resonant circuit 43 forms a high impedance parallel resonant circuit for the incoming Y-axis sense signal so as not to affect the receipt of the sense signal.

The X-axis sense signal and the Y-axis sense signal are applied to a differential device 44 which may take the form of a differential amplifier 151 as described in detail below with respect to FIG. 5. The differential device provides an output signal representing the difference between the two input signals. The output of the differential device 44 represents the sense signal associated with the axis for which the burst drive signal was just applied to the touch panel, common mode noise from the other channel being eliminated from the output signal of the differential device 44.

Figure 3:
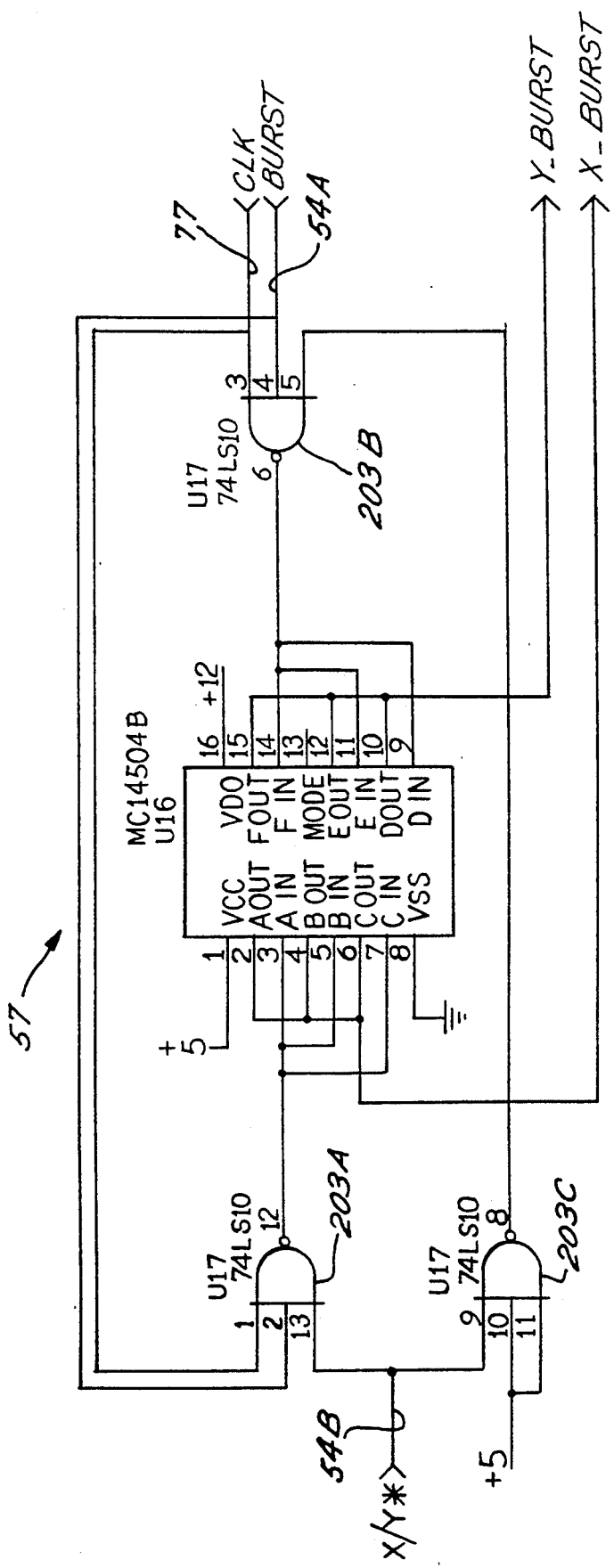
FIG. 3 is a schematic diagram of a burst generator illustrated in FIG. 1.

FIG. 3 is a more detailed schematic diagram of the burst generator 57 illustrated in FIG. 1. Specifically, the burst generator 57, which responds to the sub-controller 55 to provide either the X or the Y channel burst signals, is constructed from a level shifter 201 (a MC14504B chip) and NAND gates 203A, 203B and 203C. The burst generator 57 provides a burst signal along either X-burst or Y-burst conductors 56 and 58, respectively, whenever a burst enable signal is received on a conductor 54A. If an X-channel select signal is placed upon an X/Y* conductor 54B, the NAND gate 203A selects the X-burst conductor 56. If instead a Y-channel select signal is placed upon the conductor 54B, the NAND gate 203B selects the Y-burst conductor 58. The clock signal, originating from the clock oscillator 78, sets the frequency of the burst, while the duration of the burst is controlled by the sub-controller 55. Particularly, the sub-controller 55 ends the burst by removing the burst enable signal from the conductor 54A.

Figure 8:
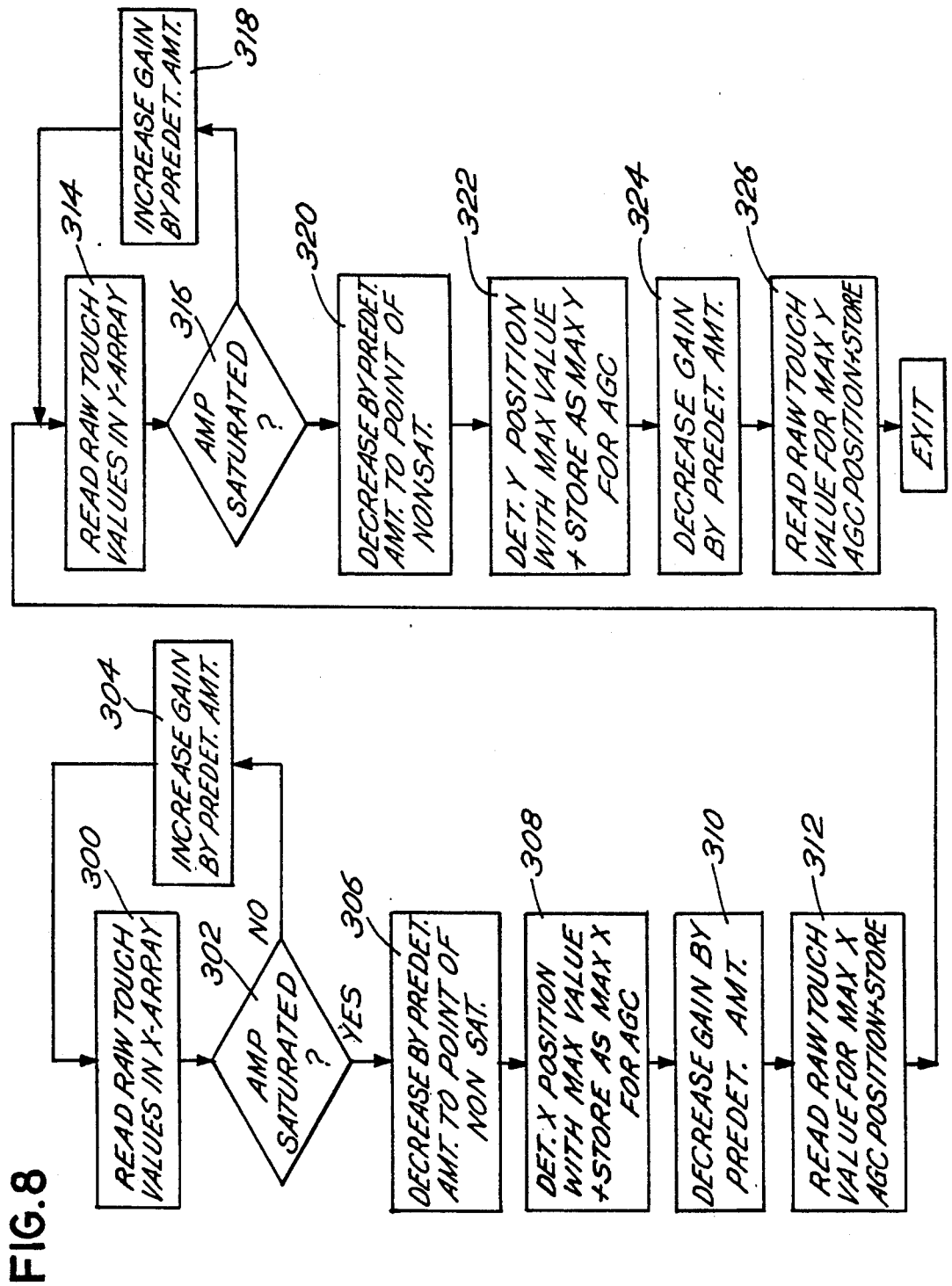
FIG. 8 is a flow chart illustrating an AGC Initialization software subroutine of the controller.

FIGS. 4A-E are more detailed schematic diagrams of the controller illustrated in FIG. 1. Referring to FIG. 8, the host computer 50 gains access to the sub-controller 55 by placing the address of the controller card 53 on address conductors A3-A9 of the HOST ADDRESS BUS, and by generating an AEN (address enable) signal. A comparator 111 (a 74LS688) compares the address on the conductors A3-A9 and the AEN signal with a digital code set by a plurality of jumpers W5-W11 at 113. In response to a proper address, the comparator 111 generates a controller card select signal, SELECT*, that permits access to the controller card 53.

Specifically, the SELECT* signal is sent to a pair of OR gates 115, 117 to permit either read or write operations to be initiated by the host computer 50. If a read operation is to be initiated, the host computer 50 generates additional command signals to cause an acoustic wave scan of the panel 11, resulting in the processing of X-axis or Y-axis sense signals and the storage of data representative thereof in the RAM 67 from which the data is then read into the RAM 70. If a write operation is to be initiated, the host computer 50 generates additional command signals for a digital gain value to the D/A converter 61. The controller 55 responds to the command signals from the host computer 50 by generating a plurality of control signals at appropriate times in order to effectuate the write operation.

Particularly, the host computer 50 generates control signals IOWR and IORD. These signals, together with the signals on address conductors A0 and A1 of the HOST ADDRESS BUS and a developed DONE signal (see FIG. 9), are sent to a buffer 119 where control signals ID0, BA0, BA1, WR* and RD* are developed. The BA0 and BA1 are equal to the logic signals placed on address conductors A0 and A1, respectively. The control signal RD* and WR* are equal to the IORD and IOWR signals generated by the host computer 50. Similarly, the ID0 control signal is equal to the signal generated on the DONE conductor.

The RD* is input to the OR gate 115 and is used to generate control signals RSTAT and RDD from a decoder/demultiplexer 121. When RD* is at a high logic level (HIGH or H), RSTAT and RDD are HIGH. If RD* is at a low logic level (LOW or L), then RSTAT and RDD are determined by input values BA1 and BA0 according to the following table:

| BA0 | BA1 | RDD | RSTAT |
|-----|-----|-----|-------|
| L | L | L | H |
| H | L | H | L |
| L | H | H | H |
| H | H | H | H |

The control signal WR* is equal to the IOWR signal generated by the microprocessor. The WR* is input to the OR gate 117 and is used to generate a counter reset signal (CTRRST), a CK signal and a CH signal via a decoder/demultiplexer 123. A START signal is in turn generated by the CH signal. When WR* is LOW, then CTRRST, CK and CH are determined by input values BA1 and BA0 according to the following table:

| BA0 | BA1 | CTRRST | CLK | CH |
|-----|-----|--------|-----|-----|
| L | L | L | L | L |
| H | L | H | H | L |
| L | H | L | H | H |
| H | H | L | H | L |

The host computer 50 places data onto the HOST DATA BUS on conductors D0-D7 (shown in FIG. 10) for writing data to the D/A converter 61 as well as to generate the channel select signal on the X/Y* conductor 54B. Specifically, the data from the HOST DATA BUS conductors D0-D7 passes to INTERNAL DATA BUS conductors ID0-ID7 via an octal bus transceiver 157. The data on the INTERNAL DATA BUS conductors ID0-ID7 is latched in the flip-flops 127 upon the CK signal. Thus, the select signal on the X/Y* conductor 54B is latched to the same value as the D0 signal generated on the HOST DATA BUS by the host computer 50. Similarly, LATCHED GAIN VALUE conductors DA6-DA0 assume the state of HOST DATA BUS D1-D7, respectively. The conductors DA6-DA0 contain the digital gain value for use by the circuit 59.

A flip-flop 125 receives the CH signal and the clock signal (CLK) on the conductor 77 for generating the START signal. The START signal is generated on the positive going edge of the CLK signal.

The control logic signals generated by the sub-controller 55 are those necessary to control burst generator 57 during a read operation in order to initiate a burst output of a determined duration at either the X-axis transducer or the Y-axis transducer. As shown in FIG. 4B, the burst enable (BURST) signal is generated on the conductor 54A by a pair of NOR gates 126, 128. The BURST signal goes HIGH upon the generation of the START signal. The 2BURST signal terminates and returns to a logic LOW upon the XADDR_BUS conductor XA5 going logically HIGH. The conductor XA5 goes HIGH after 32 counts of an address counter 129 (FIG. 4C) described hereinafter. Thus, the host computer 50 generates IOWR, A0 and A1 control signals in order to first write a select value onto the X/Y* conductor 54B via the buffer 127, selecting the X-axis or Y-axis transducers, and then secondly to start the burst output from the burst generator 57 to the selected transducer.

Figure 4A:
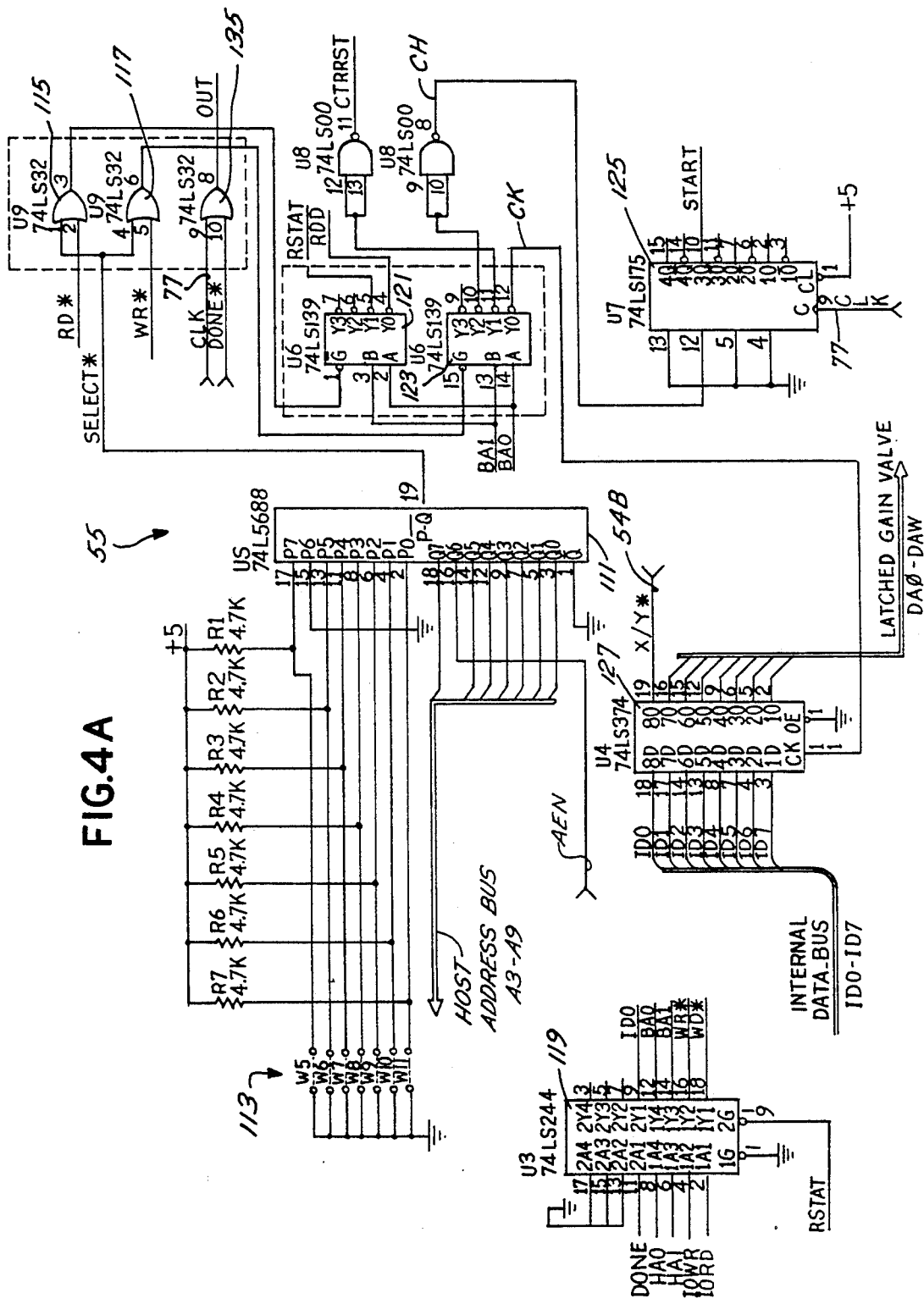
Figure 4C:
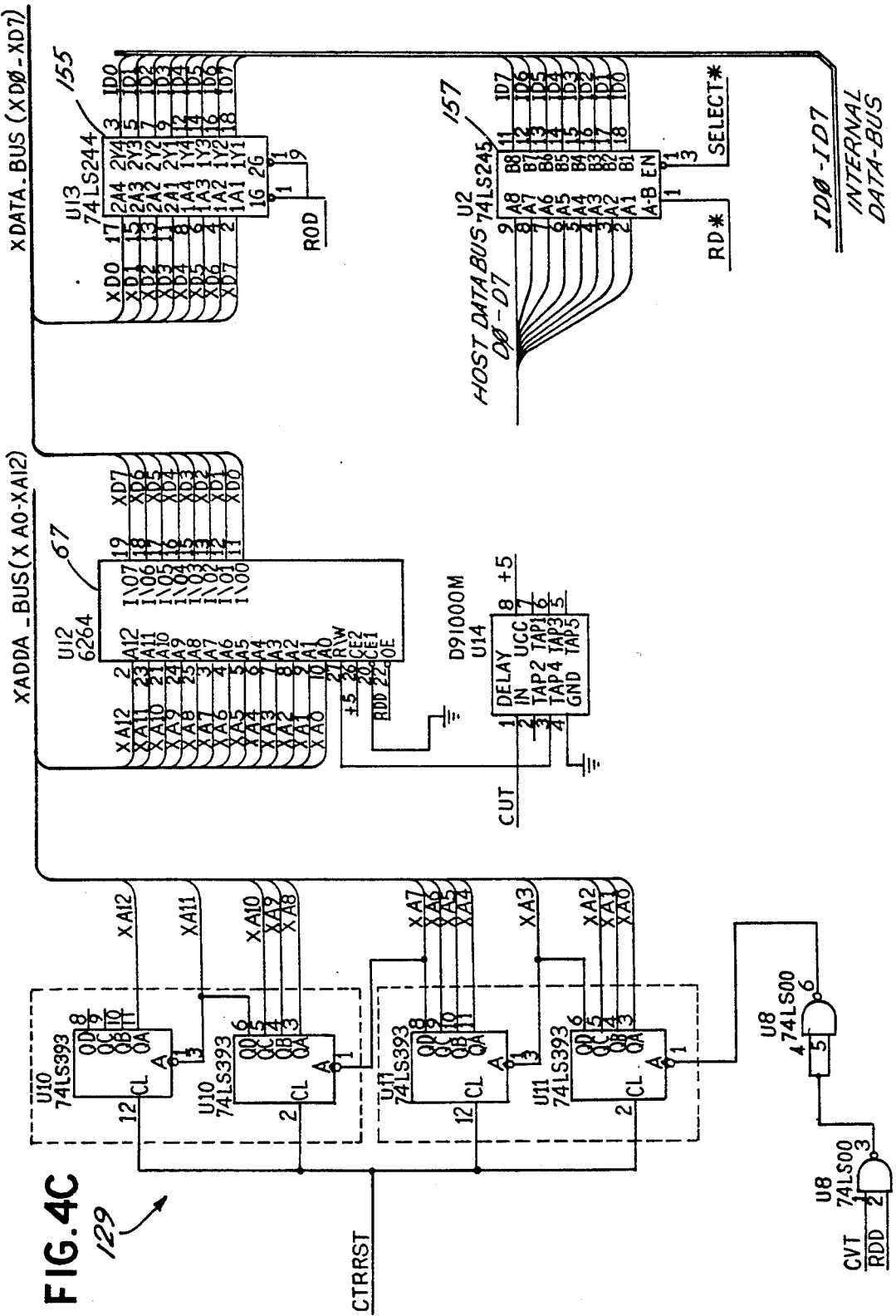
Figure 4E:
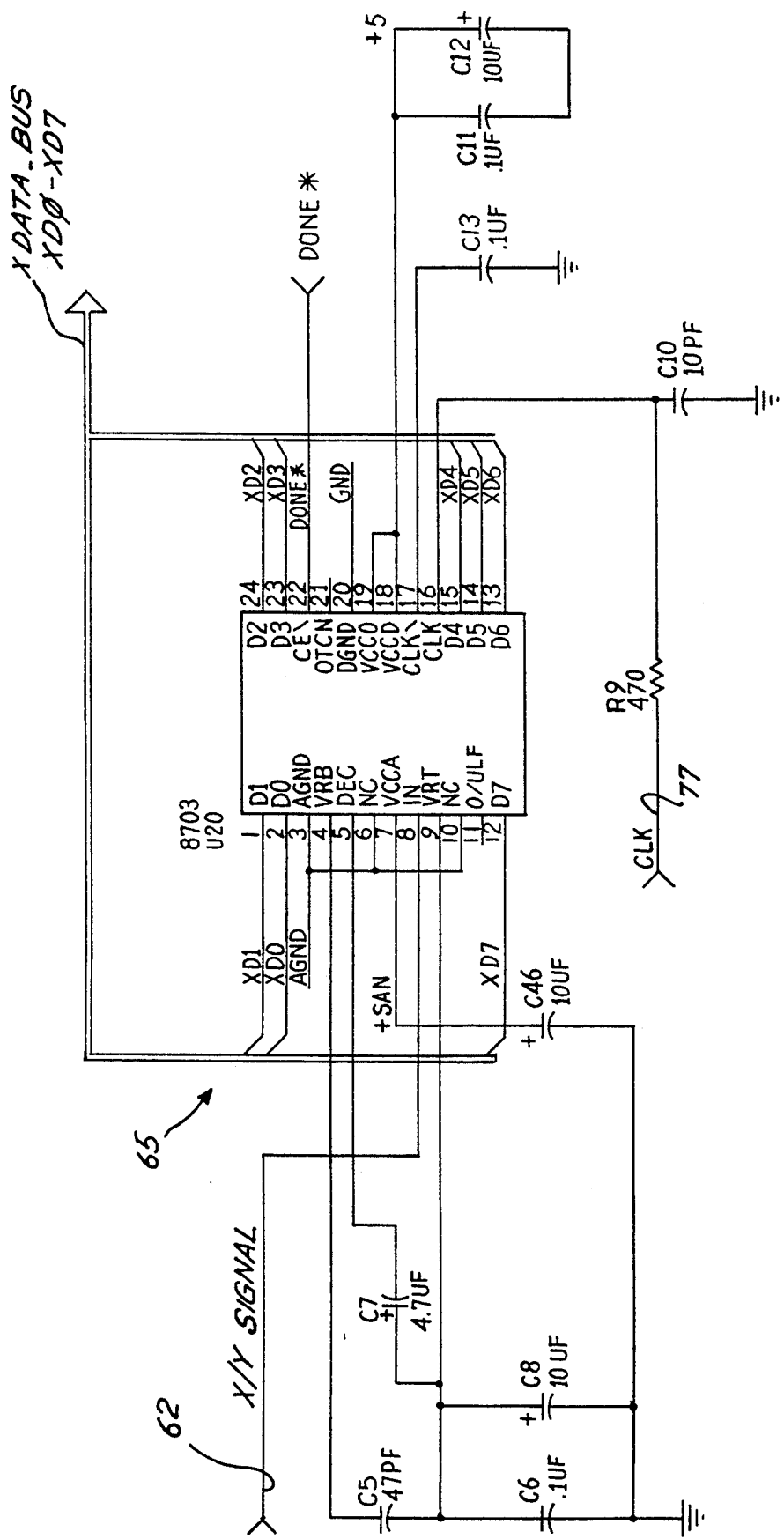

FIG. 4E is a more detailed schematic diagram of the A/D converter 65 illustrated in FIG. 1. The sense signal X-axis or the Y-axis sense signal which has been amplified, filtered and demodulated by the circuit 59 is input as an X/Y SIGNAL via the conductor 62 to the A/D circuit 65. Specifically, an A/D converter (Chip 8703) receives the X/Y SIGNAL and generates output digital signals onto XDATA_BUS conductors XD0-XD7.

As shown in FIG. 4C, the data on the XDATA_BUS conductors XD0-XD7 is fed to the RAM 67 (chip 6264) for storage in the address defined by an address signal appearing on XADDR_BUS conductors XA0-XA12. Addresses are generated by an address counter 129 in timed sequence with the A/D converter 65. The counter 129 counts according to the negative going edges of a CVT signal. The RDD signal must be kept HIGH to permit the CVT signal to increment the counter 129.

Returning to FIG. 4B, the NOR gates 131, 133 serve to develop a DONE signal and a DONE* signal, both of which are initiated by the START signal and terminated by a signal on the XADDR_BUS conductor XA11. The conductor XA11 goes HIGH at count 2048 of the address counter 129 (FIG. 10). The DONE* signal is used to generate the RAM clocking signal CVT via an OR gate 135 (FIG. 8). The CVT signal controls the storage of digital data by the RAM 67 (FIG. 10) in conjunction with the RDD signal. At the start of the read operation, the host computer 50 holds the IORD signal HIGH, keeping the RDD signal HIGH. With the RDD signal HIGH, the counter 129 begins counting upon the generation of the START signal.

As shown in FIG. 4C, the counter rest signal CTRRST serves to reset counter 129. The CTRRST signal is generated under control of the host computer 50 via the IOWR, A0 and A1 signals. As shown in FIG. 4A, the CVT signal, which serves as a clock for driving counter 129, is terminated upon generation of the DONE* signal, i.e., at count 2048. As shown in FIG. 4B, the DONE* signal is turned OFF upon generation of the START signal and then turned ON when the counter 129 reaches a count of 2048. This serves to terminate the CVT signal via the OR gate 135 and thus the counter stops counting at count 2048.

Returning to FIG. 4C, data is transferred to and from the host computer 50 via the octal bus transceiver 157. The transceiver 157 is enabled by the controller card SELECT* signal. The RD* signal controls the direction of data transfer. If the RD* is HIGH, data is transferred from the host computer 50 to the controller card 53. If the RD* is LOW, data is transferred to the host computer 50 from the controller card 53. More specifically, the transceiver 157 provides a single direction data pathway between the HOST DATA BUS and the INTERNAL DATA BUS if the controller card 53 is being selected (via the SELECT* signal). The RD* signal controls the direction of the pathway.

Upon the counter 129 reaching a count of 2048, the storage in the RAM 67 of the 2048 digital samples of the shear wave data is complete. The host computer 50 then reads the data from the RAM 67 via a buffer 155 and the transceiver 157. The counter 129 is reset by generation of the CTRRST signal, which in turn changes the XA5 and XA11 signals in the logic circuitry of FIG. 4B so that the CVT clocking circuit directly drives the counter 129 and the RAM 67. A delay circuit U14 (D51000M chip) delays the CVT to the RAM 67 to ensure that the proper address stabilizes before reading (or writing) data from the RAM 67. When counter 129 reaches count 2048, the reading of the RAM 67 terminates.

The signal ID0 is the buffered version of the DONE signal at the tri-state flip-flops 119 (FIG. 4A). ID0 assumes the state of DONE when the RSTAT control signal is driven LOW. When RSTAT is HIGH, the ID0 conductor floats. This is significant since ID0 is connected via another LS244 buffer 155 (FIG. 4C) to the XDATA BUS from the RAM 67 and A/D converter 65, and is also connected via the transceiver 157 to the HOST DATA BUS conductor D0.

In addition, the data placed on the LATCHED GAIN VALUE conductors DA0-DA6 (as latched by the flip-flops 127) is transmitted to the D/A converter 61, as shown in FIG. 4D. From the data on the conductors DA0-DA6, the D/A converter 61 (a DAC08 chip) generates an automatic gain control voltage as the OFFSET signal on the conductor 64. The OFFSET signal is applied to the circuit 59. Specifically, the offset signal on the conductor 64 is applied to adjust the gain of an RF AGC amplifier 151 (an MC1350 chip), as shown in FIG. 5A.

Figure 5A:
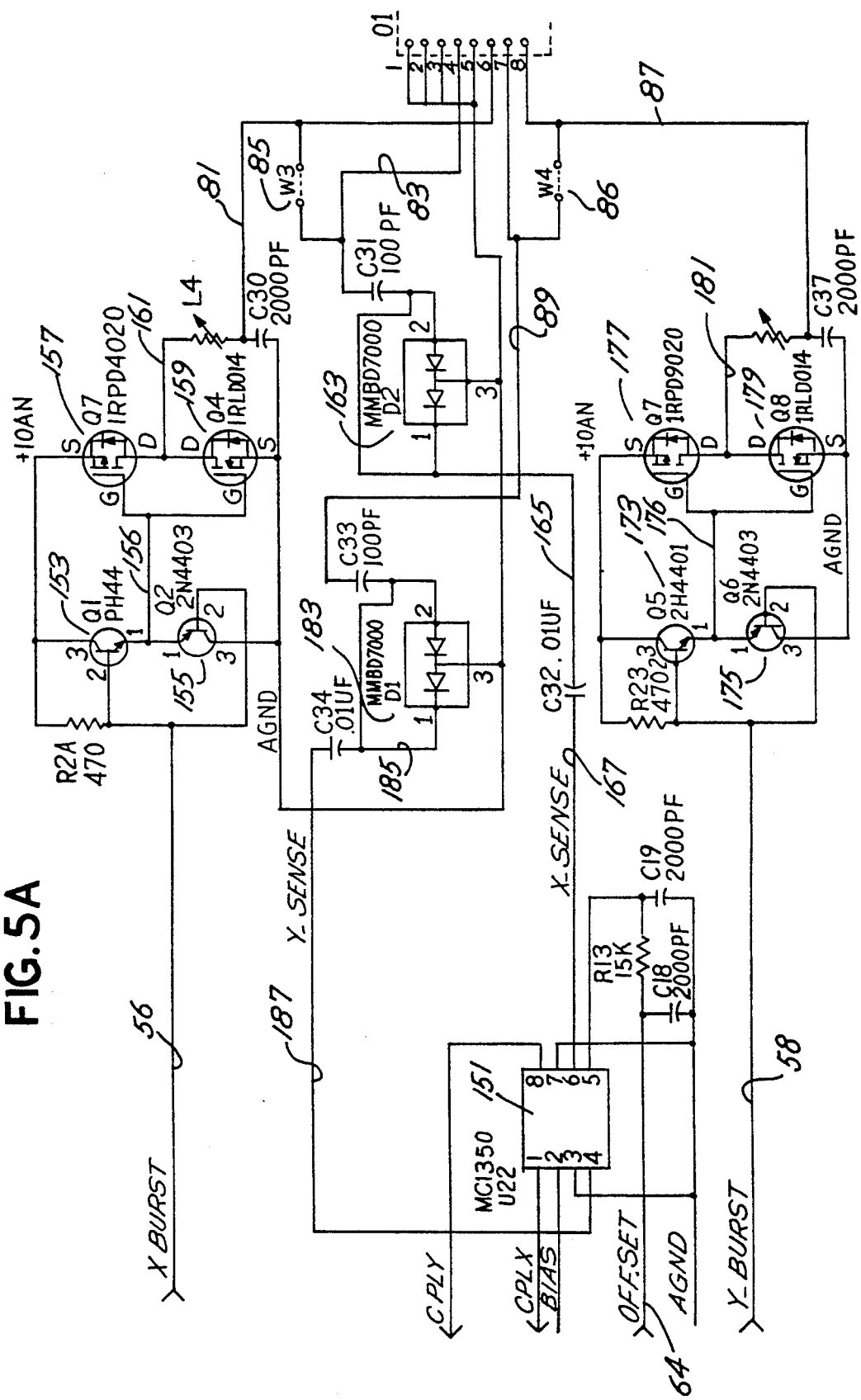
FIGS. 5A-B form a schematic diagram of the signal conditioning circuit of the present invention.
Figure 5B:
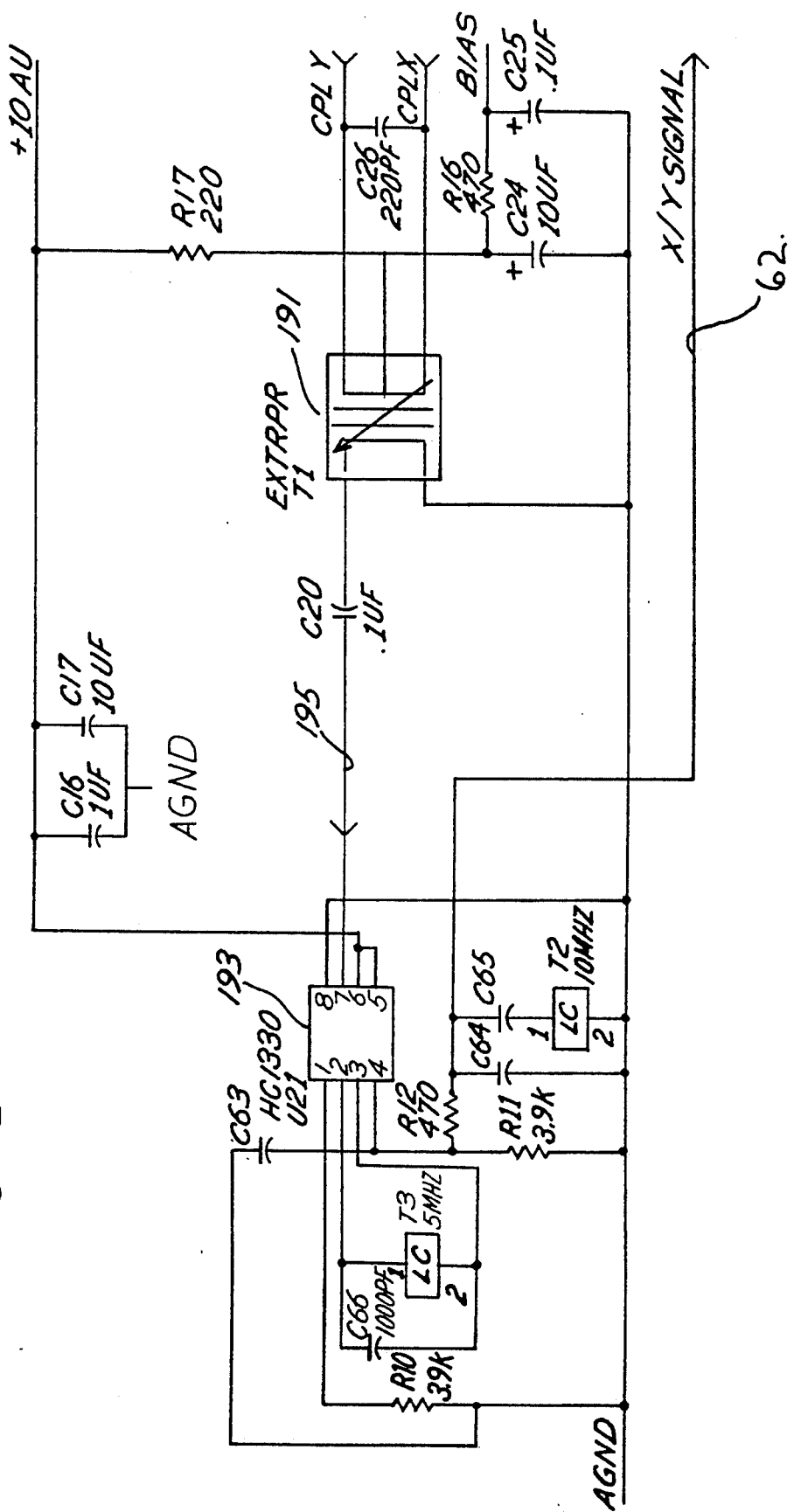

FIGS. 5A and 5B form a schematic diagram of the signal conditioning circuit 59 shown in FIGS. 1 and 2. Referring to FIG. 5A, the X-BURST signal from the burst generator 57 appears along the conductor 56 through a pair of transistors 153, 155 which are arranged in a complementary emitter-follower push-pull configuration. This configuration provides very fast switching characteristics responsive to the X-burst signal. The transistors 153 and 155 provide a square wave version of the X-BURST signal on a conductor 156. A pair of MOSFET switches 157, 159 (IRFD9020 and IRLD014, respectively), connected in a complementary arrangement, respond to the X-BURST signal on the conductor 156 by providing a very low source resistance pathway from a conductor 161 to either analog ground (AGND) or a corresponding +10 Volt supply (+10AN). Thus, the signal on the conductor 161 inversely tracks the X-BURST signal on the conductor 56.

The signal on the conductor 161 drives the resonant circuit comprising the inductor L4 and the 2000 picofarad capacitor C30, the resonant circuit forming a series resonant circuit through which the X-burst signal is applied to the X-axis transmitting transducer 17, 18. Responding to the 5 MHz toggling of the signal on the conductor 161 between +12 AN and AGND, the resonant circuit boosts the +12 volts from the +12 AN supply to 150 volts or more, peak-to-peak, on the conductor 81. The X-axis transmitting transducer 17, 18 responds by imparting an acoustic wave into the respective touch panel 11A, 11B. If the touch panel 11B is used, the jumper 85 provides a sensing pathway from the conductor 81 to the differential amplifier 151. A diode pair 163 (MMBD7000), however, protects the amplifier 151 by clamping the high-voltage peak-to-peak signal received. In addition, because the diodes are driven on, the capacitance added by the sensing pathway is small in comparison to the capacitance of the transmitting pathway. Therefore, the Q-factor associated with the series resonant transmitting pathway is not greatly affected.

The incoming signal representative of the acoustic waves developed in the touch panel 11B is input from the transceiving transducer 18 through the conductor 81, jumper 85, conductor 83, and a sensing pathway to the differential amplifier 151. If, however, the panel 11A is used, the incoming signal passes from the receiving transducer 19 through the conductor 83 and a sensing pathway. The sensing pathway includes a capacitor C31 (100 picofarad), a conductor 165, a capacitor 32 (0.01 microfarad) and an X_SENSE conductor 167. The diode pair 163 is not driven on when sensing; therefore, using either panel 11A or 11B, the reactance of the sensing pathway is low in comparison with the input impedance of the AGC amplifier 151, yielding low signal loss.

Immediately after the X-BURST signal has been removed from the conductor 56, the MOSFET switch 159 provides a continuous low channel resistance pathway to AGND for the conductor 161. Although this pathway has little relevance when using the touch panel 11A, using the two-transducer configuration of the panel 11B, this pathway to AGND provides a parallel-resonant circuit of high impedance, tuning out the cable and transducer capacitance from the incoming signal.

Similarly, the Y-BURST signal on the conductor 58 drives a pair of transistors 173, 175. The transistors 173, 175 in turn drive a pair of MOSFET switches 177, 179 along a conductor 176. The MOSFET switches 177, 179 drive a series-resonant pathway from a conductor 181 to the transducer 21 or 20. The inductor L5 and the capacitor C37 (2000 picofarad) form this series-resonant pathway when the circuit is in the Y-axis drive signal generation mode. As in the X channel, the sensing pathway is governed by the jumper 86 (if used), the conductor 89, a capacitor C33 (100 picofarad), a conductor 185, a capacitor C34 (0.01 microfarad) and a Y_SENSE conductor 187.

A differential amplifier 151 receives the X-axis and Y-axis sense signals from the X-axis and Y-axis receiving transducers on respective X_SENSE and Y_SENSE conductors 167 and 187, simultaneously. The differential amplifier 151 provides a signal CPLX representing the difference between the X-axis sense signal and the Y-axis sense signal during the X-axis sense mode. The differential amplifier 151 further provides a signal CPLY representing the difference between the Y-axis sense signal and the X-axis sense signal during the Y-axis sense mode. Because both the X and Y channels simultaneously sense, spurious vibrations in the touch panel 11A, 11B along with other common circuit noise can be eliminated by the differential amplifier 151.

Referring to FIG. 5B, the conductors CPLX and CPLY are input to an isolation transformer 191 which provides an output to a demodulator 193 (an MC1330 chip) through a capacitor C20 (0.1 microfarad) and a conductor 195. The demodulator 193 demodulates the resulting difference signal, sending the demodulated signal along the conductor 62 to the A/D converter 65 so that it may be converted to a digital format and stored in the RAM 67. The demodulated signal can represent either an X-axis sense signal or a Y-axis sense signal, the signal being labeled as the X/Y SIGNAL in FIG. 5B. The signal on the conductor 195 might also be sent directly along the conductor 62 to the A/D converter 65, possibly sampling at a higher rate, for conversion, storage, and transfer to the host computer 50. Once transferred, the host computer 50 might conduct digital demodulation, alleviating the need for the demodulator circuit shown in FIG. 5B.

The signal conditioning circuit 59 of the controller of the present invention provides X and Y axis sense signals that have been processed using common mode rejection techniques to eliminate common circuit noise and common noise associated with the touch panel such as resulting from spurious acoustic waves that impinge on both the X-axis and Y-axis receiving transducers. Further, the use of the resonant circuit formed by the inductor L4 and capacitor C30 and the resonant circuit formed by the inductor L5 and capacitor C37 provide a series resonant path for the respective X-axis and Y-axis burst signals while providing a parallel path of high impedance for the respective incoming X-axis and Y-axis sense signals.

Figure 6:
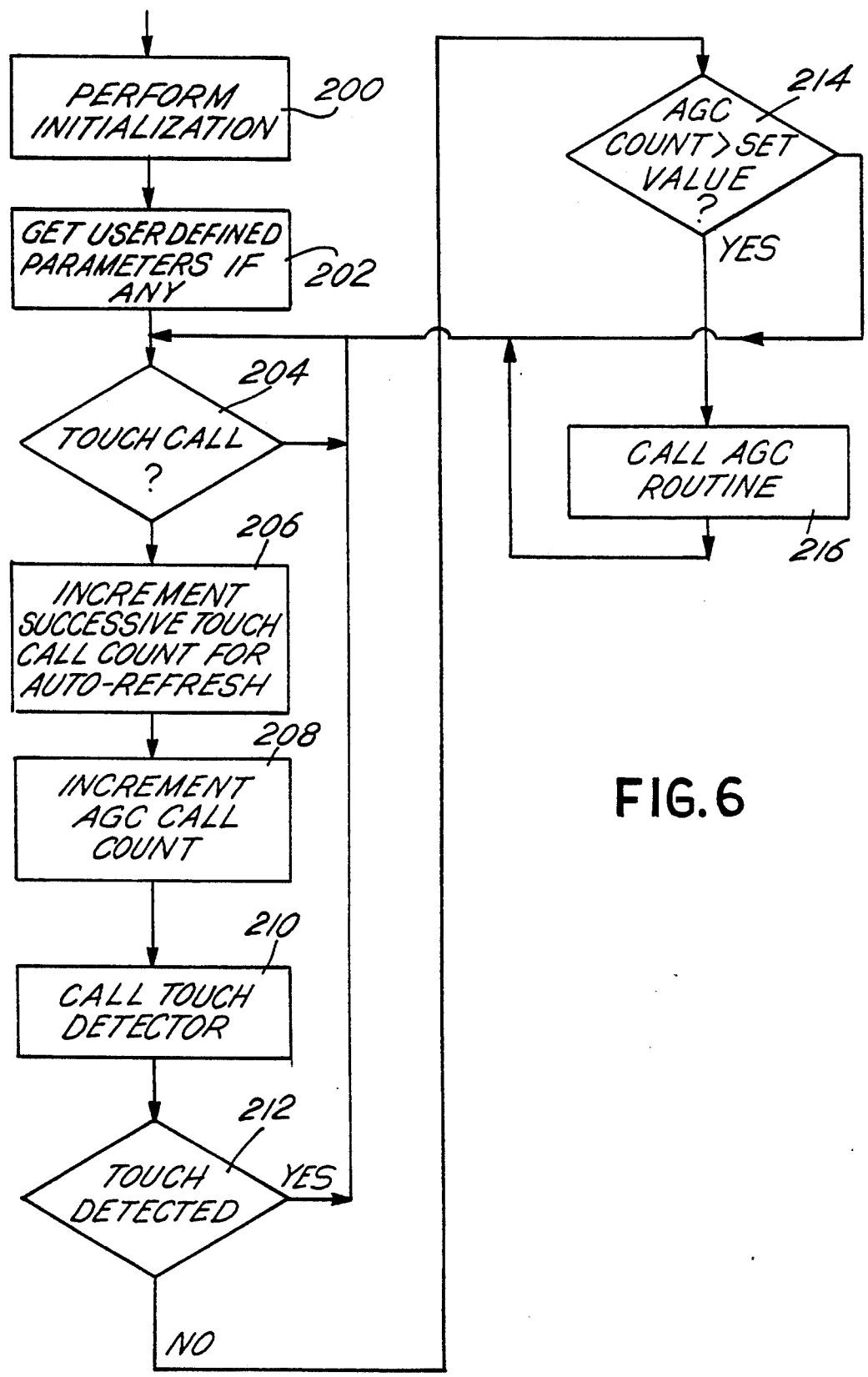
FIG. 6 is a flow chart illustrating a Main software subroutine for the controller of the present invention.

The signal processing software of the controller of the present invention will be described with reference to FIGS. 6–9. As shown in FIG. 6, at the start of the operation of the acoustic wave touch panel 11A, 11B the microprocessor 51 performs an initialization operation in which various counters and variables are set to their initialization values. At this step the microprocessor 51 implements the AGC, automatic gain control, initialization routine depicted in FIG. 8 as discussed in detail below. After performing the initialization operation at block 200, the microprocessor 51 proceeds to block 202 to get the user defined parameters if there are any.

The user defined parameters include a threshold setting, a definition of an active touch region, a designation of the corner representing the origin of the X and Y axes, i.e. the (0,0) position; a guard band value, the number of consecutive touches before automatic refresh is performed; and the number of consecutive touch calls in the absence of a detected touch before refresh is performed. The threshold value determines the minimum value which must be exceeded by both the X axis and Y axis sense signals before a touch will be detected. The touch panel 11A, 11B may be divided into active and inactive regions such that the controller responds to X and Y axis signals from the signal conditioning portion of the controller that represent a touch only if the touch corresponds to a position within the user defined active region of the touch panel. Because an active region of the touch panel can be defined, a touch panel of standard size can be used in applications requiring a touch responsive or active area of a smaller size, the touch responsive area being positioned anywhere on the panel. It is noted that although the touch panel itself is responsive to a touch on the inactive areas of the panel, the controller does not recognize a touch on the inactive area. The origin, i.e. (0,0) coordinates, of the touch panel may also be defined by a user as the upper right hand corner of the panel, the lower right hand corner of the panel, the lower left hand corner of the panel or the upper left hand corner of the panel. The controller automatically modifies the X and Y axis touch positions to provide X and Y axis coordinates determined relative to the designated origin. The guard band allows a user to set the resolution of the touch panel. Further, adjustments to the guard band may be made to prevent jitter of a detected touch position where jitter is a change in the determined touch position when the actual position of a touch has not changed. The number of consecutive touches before refresh value may be set by a user to control the number of consecutive touches that will be allowed before a touch is ignored. This feature ensures the operation of the touch panel in hostile environments such that dirt or other undesirable materials are ignored and not reported as touches. The number of consecutive touch calls in the absence of a touch before refresh may be adjusted so as to prevent detection of spurious touches that might appear as a result of changes in temperature, supply voltage, etc. In hostile environments, the value is preferably set to a small number. If the user does not define the above-identified parameters, the microprocessor 51 utilizes default values for these parameters.

From block 202, the microprocessor 51 proceeds to block 204 to determine whether a touch call interrupt has been received. If so, the microprocessor 51 proceeds to block 206 to increment the successive or consecutive touch call count for automatic refresh. Thereafter, at a block 208 the microprocessor 51 increments the AGC call count and thereafter proceeds to block 210 to call the touch detector routine depicted in FIG. 7. If the microprocessor 51 determines that a touch has been detected, at a block 212, the computer 50 returns to block 204. If no touch has been detected, however, the microprocessor 51 proceeds to block 214 from block 212 to determine whether the AGC count incremented at block 208 is greater than a predetermined value. If so, the microprocessor 51 proceeds to block 215 to call the AGC routine depicted in FIG. 9 as discussed in detail below. From block 214 or block 216, the microprocessor 51 proceeds back to block 204.

More particularly, in order to detect the occurrence of a touch on the touch panel 11A, 11B, the microprocessor 51 utilizes two arrays for each of the X and Y axes, the current array and the base array. The current X axis array is an array in the RAM 70 of discrete magnitude values each of which is associated with a different position along the X axis where the magnitude values are digital representations of the current X axis sense signal received from the A/D converter. Similarly, the current Y axis array is an array in the RAM 70 of discrete magnitude values each of which is associated with a different position along the Y axis where the magnitude values are the digital representations of the current Y axis sense signal received from the A/D converter. The microprocessor 51 in accordance with the touch detector subroutine depicted in FIG. 7 calculates at block 240, for each of the X and Y axes and for each of the magnitude values associated with positions in the active touch region of the panel 11A, 11B, the difference between the current magnitude value and the base array magnitude value associated with the same position with respect to a given axis. Thereafter, at a block 242, the microprocessor 51 determines whether a maximum calculated difference value for the X axis is less than a threshold touch value that is either user defined or a default value. If so, the microprocessor 51 proceeds to block 244 to determine whether the touch call count incremented at block 206 is greater than the user defined or default value set for the number of consecutive touch calls with no touch before refresh value. If the touch call count is greater than the set value, the microprocessor 51 proceeds to block 246 to refresh the base array of reference magnitude values. If the maximum difference value associated with the X axis is not less than the threshold value as determined at block 242, the microprocessor proceeds to block 248 to determine whether the maximum difference calculated for the Y axis is less than the touch threshold value. If so, the microprocessor proceeds to block 244 as discussed above. Otherwise, the microprocessor detects a touch and proceeds to block 250. At block 250, the microprocessor 51 stores the maximum difference values calculated at block 240 for the X axis and the Y axis as X as Y raw maximum difference values which are used as discussed below to determine the pressure of the detected touch. At a block 252, the microprocessor 51 applies the X and Y axis difference signals to a software low pass filter. More particularly, at block 252, a moving average is passed along a portion of the difference signal associated with one of the axes such that an average is calculated for each difference value associated with an axial position within a given range of the maximum difference value for that axis. For example, a moving average may be calculated for the difference values associated with the axial positions within eight positions on either side of the axial position of the maximum difference value. The moving average of block 252 has the effect of increasing the magnitude of the difference signal and acts as a low pass filter. Thereafter, at a block 254, the microprocessor 51 finds the peak of the filtered values for the X axis and Y axis wherein the X touch position is determined to be the position of the peak of the filtered X axis values and the Y touch position is determined to be the position of the peak of the filtered Y axis values. The peak of the filtered values may be determined at block 254 by taking the derivative of the filtered values. One type of software derivative technique is to employ a moving sum of differences filter which is passed along the values output from the low pass filter at block 252. The peak value utilizing a sum of differences filter is found by determining when the sum goes to zero. More particularly, an example of the sum of differences is as follows.

$$\sum_{i=-R}^{i=+R} N(i+j+1) - N(i+j)$$

where N is the digital representation of an output of the low pass filter associated with a touch position and R represents the range of the sum at each point along which the derivative is moved. R should be small compared to the number of touch positions within a typical width of a touch. For example, a value of $R = \pm 8$ is typically satisfactory. The variable j represents each point in the array for which the sum of the differences is calculated and about which the range is centered. The first value of j may be 8 positions above the position at which the sense signal first goes above the threshold. A sum is then determined for successive values of j until a j is found for which the sum goes to zero, that j corresponding to the peak.

Thereafter, at a block 256, the microprocessor 51 calculates the Z axis coordinate, i.e. touch pressure, from the average of the X and Y raw maximum difference values stored at block 250. Thereafter, at a block 258, the X touch position determined at block 254 is corrected relative to the active region of the touch panel along the X axis. For example, if the uncorrected X touch position is 40 units from the X axis origin but the active region along the X axis is offset from the origin by 30, then the microprocessor 51 at block 258 corrects the touch position to reflect the offset by setting the X touch position to 10. At block 260, the microprocessor 51 similarly corrects the Y touch position relative to the user defined Y axis active region. Thereafter, at block 262, the microprocessor 51 determines whether a X axis home corner modification is required. If the origin (0,0) of the touch panel is in the upper left corner of the panel no modifications are required for either axis. If, however, the receiving transducers of the touch panel are in the upper right hand corner of the display, the start and finish for the X axis is reversed. Similarly, if the transducers are in the lower left corner of the display, the start and finish of the Y axis are reversed. Then the transducers are in the lower right corner of the display, the start and end of the X axis as well as the start and end of the Y axis are reversed. Therefore, if the microprocessor 51 determines that the transducers are mounted in the upper right or lower right corners of the display, the X axis home corner modification is required and the microprocessor proceeds to block 264 to calculate the X coordinate for the defined home corner. Similarly, if the microprocessor at block 266 determines that the transducers are mounted in the lower left corner or the lower right corner of the touch panel so that a Y axis home corner modification is required, the microprocessor proceeds to block 268 to calculate the Y coordinate for the defined home corner.

After performing any necessary home corner modifications to the X and Y coordinates, the microprocessor 51 proceeds to block 270 to determine whether the number of consecutive touches is greater than the user defined value and if so, the microprocessor proceeds to block 272 to refresh the base array by setting the base array representing an untouched panel equal to the values stored in the current array. From blocks 270 or 272, the microprocessor proceeds to block 274 to determine whether this is the first of a series of touches by looking to a touch flag to determine whether the flag changed from a no touch status to a touch status. If this is a first touch, the microprocessor 51 proceeds to block 280 to store and report the calculated X, Y and Z coordinates for the first touch. Otherwise, the microprocessor 51 proceeds to block 276 from block 274 to determine whether the new X position is within the guard band of the last stored X position of a touch. If the new X position is within the guard band, the microprocessor proceeds to block 278 to determine whether the new Y position is within the guard band of the last stored Y position value. If so, the microprocessor proceeds to block 282 to report the stored X, Y and Z coordinates. However, if the new X or Y positions are outside of the guard band of the last stored X and Y positions, the microprocessor proceeds from a respective block 276 or 278 to a block 290 to store and report new X, Y and Z coordinates. The use of the user defined or default guard band values at blocks 276 and 178 prevents a determined touch position from jittering so that the calculated or reported touch position does not change when the position of an actual touch is not changed.

Figure 7:
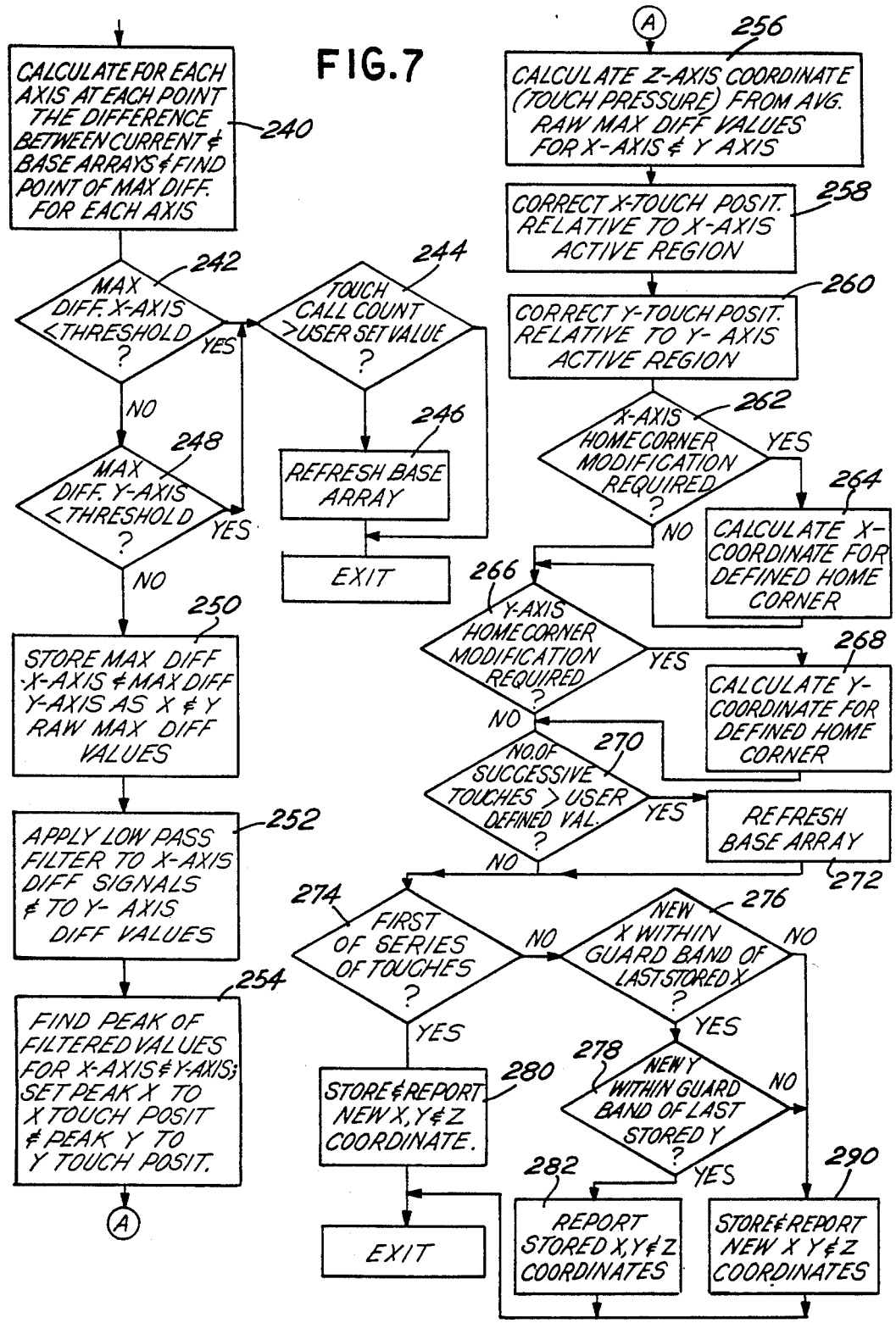
FIG. 7 is a flow chart for a Touch Detector software subroutine of the controller.
Figure 10A:
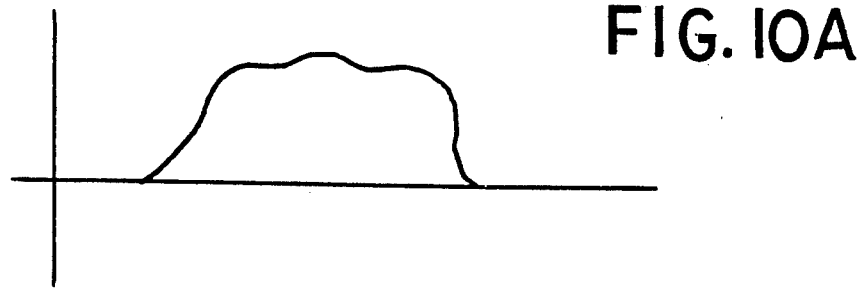
FIGS. 10A-E represent graphs of data processsed by various components of the controller of the present invention.
Figure 10B:
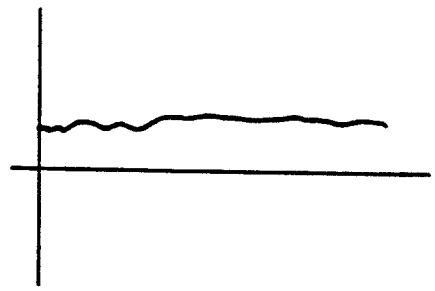
Figure 10C:
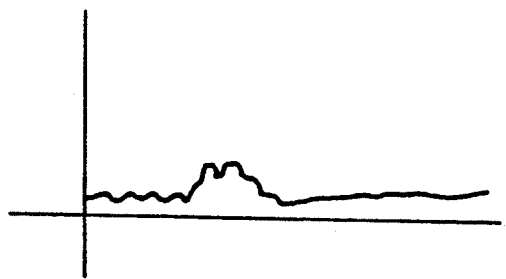
Figure 10D:
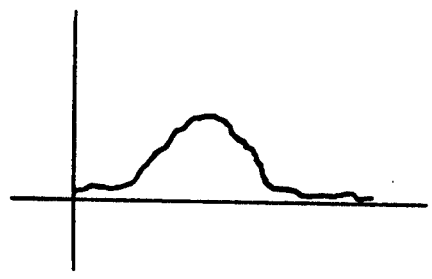
Figure 10E:
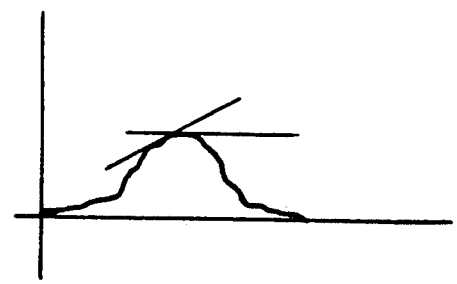

The operation of the touch position algorithm of FIG. 7 is illustrated by the graphs depicted in FIGS. 10A-D. The graph of FIG. 10A represents raw data received in response to a burst drive signal being applied to one axis of the touch panel 11A, 11B. FIG. 10B represents the difference between two signals as shown in FIG. 10A when no touch is present. As seen from FIG. 10B, the difference between the current and base array values when no touch is present is flat with some noise. A graph of the difference signal calculated at block 240 for a relatively light touch is depicted in FIG. 10C. In FIG. 10C the difference signal shows a bump, the bump representing a touch with some noise. By running a moving average along the bump portion of the signal depicted in FIG. 10C as occurs by applying the signal to the low pass filter at block 252, the bump portion of the signal smoothes out and the amplitude thereof increases as shown in FIG. 10D. When the signal depicted in FIG. 10D is applied to the peak detector of block 254, the sum of differences algorithm implemented therein uses integer arithmetic to study the slope of the curve. When a sum of the differences is found that is zero, the array position corresponding to the midpoint of the range over which the sum is calculated represents the peak, i.e. the position of a touch with respect to one axis of the touch panel 11A, 11B. As discussed above, other peak detection or differentiation schemes may be used as well as other low pass filtering schemes depending upon the sophistication and power of the microprocessor 51 employed.

In order to initialize the controller of the present invention for automatic gain control of the R.F. amplifier 151 at block 200, the microprocessor 51 implements the routine depicted in FIG. 8. It is noted that although the R.F. amplifier as shown in FIG. 5 is also the differential amplifier 151 as discussed above, a separate R.F. amplifier with an adjustable gain may also be employed. The routine depicted in FIG. 8 first reads the raw touch values in the raw data array associated with one axis such as the X axis array at a block 300. Thereafter, at a block 302 the microprocessor 51 determines whether the amplifier 151 is saturated or not. If the microprocessor 51 determines from the raw touch values read from the X axis array that the amplifier 151 is not saturated, the microprocessor proceeds to block 304 to increase the gain by a predetermined amount. The microprocessor 51 loops through blocks 300, 302 and 304 until the amplifier 151 is driven to saturation. Saturation of the differential amplifier 151 is indicated when the output of the analog to digital converter is at its limit representing a maximum gain for the amplifier 151. For example, if the maximum output of the A/D converter is 255 least significant bits, the amplifier 151 is determined to be saturated when the output of the analog to digital converter is at 255 least significant bits. It is noted that the output of the analog to digital converter may be inverted, however, such that at the maximum gain of the amplifier 151, the output of the analog to digital converter is zero. In that case, the amplifier 151 is determined to be saturated at block 302 when there are one or more points in the X axis array representing a zero output of the analog to digital converter. Once the amplifier 151 is determined to be saturated at block 302, the gain of the amplifier 151 is decreased by a predetermined amount such that there is no point in the raw data array associated with the X axis that indicates that the amplifier 151 or analog to digital converter is saturated. The predetermined amount by which the gain is decreased at block 306 may be as little as one least significant bit's worth on the D/A converter. Thereafter, at a block 308, the microprocessor 51 determines the X axis position associated with the maximum magnitude value stored in the X axis data array and stores this X axis position as the maximum X axis position for the automatic gain control routine depicted in FIG. 9. At a block 310, the microprocessor 51 decreases the gain again by the predetermined amount and at block 312 the microprocessor reads and stores the raw magnitude value for the maximum X position. The microprocessor then proceeds to block 314 to repeat the process for the Y axis wherein blocks 314, 316, 318, 320, 322, 324, 326 correspond to blocks 300, 302, 304, 306, 308, 310 and 312 respectively. As can be seen, the gain of the amplifier 151 is adjusted separately so that the gain of the amplifier may be adjusted differently when sensing an X axis acoustic wave signal and when sensing a Y axis acoustic wave signal.

The microprocessor 51 adjusts the gain of the R.F. amplifier 151 substantially periodically at block 216 in the absence of a detected touch on the panel 11A, 11B. More particularly, when the automatic gain routine is called, the microprocessor 51 at a block 328 reads the raw magnitude value from the X axis array that is associated with the maximum X axis touch position determined at block 308. At block 330, the microprocessor 51 determines if the raw magnitude value for the maximum touch position is determined to be equal to the maximum value determined for that touch position during the initialization routine in FIG. 8. If so, the microprocessor 51 proceeds from block 330 to block 334 to decrease the gain on the amplifier 151 by the predetermined amount. If the microprocessor determines at a block 332 that the raw magnitude value read for the maximum X axis touch position is less than the value stored at block 312, indicating that the amplifier has drifted down, the microprocessor proceeds to block 336 to increase the gain on the amplifier 151 by the predetermined amount. Whenever the microprocessor 51 adjusts the gain of the amplifier 151, the microprocessor proceeds to block 338 to force a refresh wherein the X axis base array that is used at block 240 to detect a touch is updated with the current magnitude touch values read for the axis after the gain adjustment. Thereafter, the microprocessor proceeds to block 340 to determine whether the gain of the amplifier 151 should be adjusted for Y axis sense signals. More particularly, at block 340 the microprocessor 51 reads the raw magnitude touch value associated with the maximum Y touch position determined at block 322 and at block 342 determines whether this raw value is equal to the maximum value determined for that Y axis touch position. If so, the microprocessor proceeds to block 346 to decrease the gain on the amplifier 151 when sensing Y axis touch signals by the predetermined amount. If the raw value read at block 340 is not equal to the maximum value as determined at block 342, the microprocessor 51 proceeds to block 344 to determined whether the raw touch value is less than the value stored at block 326 for the Y axis. If so, the microprocessor proceeds to block 348 to increase the gain for the amplifier 151 by the predetermined amount for sensing Y axis touch signals. If the gain of the amplifier 151 has been adjusted for the Y axis, the microprocessor proceeds to block 352 to refresh the base Y axis array.

The controller of the present invention allows acoustic wave touch panels to more accurately detect the position of a touch on the panel. As discussed above, the controller may be used with touch panels utilizing various types of acoustic waves such as shear waves, surface acoustic waves (SAW) or Rayleigh waves, lamb waves, etc. Although acoustic wave touch panels utilizing shear waves can easily be hermetically sealed without absorbing all of the shear wave energy because the shear wave energy extends through the entire thickness of the touch panel, this is not the case with acoustic wave touch panels utilizing surface acoustic waves. More particularly, it has not been possible to hermetically seal a commercially available surface acoustic wave touch panel because at the current frequency of operation of these panels, i.e. 5.5 Mhz, a hermetic seal on the touch surface of a SAW touch panel essentially absorbs all of the surface acoustic wave energy. This is because a surface acoustic wave of the Rayleigh type is bounded at one surface of the touch panel to a depth of only approximately one wave length. It has been found that by reducing the frequency of operation, the wave length increases and reduces the number of waves within an absorbing region by inverse proportion. However, it has not been possible to reduce the frequency of operation of commercially available surface acoustic wave touch panels heretofore because the signal processing used by these touch panels was not good enough to accurately sense a touch at the reduced frequency. More particularly, by reducing the frequency of the surface acoustic wave imparted into the touch panel, the amount of energy absorbed by a given touch in a given region is reduced so that the sensitivity of the panel is decreased by approximately the inverse square of the frequency.

It has been found, however, that the improved signal processing features of the controller of the present invention allow the frequency of a surface acoustic wave touch panel to be reduced sufficiently in order to hermetically seal such a panel. More particularly, the frequency of a surface acoustic wave touch panel utilizing the controller of the present invention may be reduced to between 1 and 3 Mhz. This reduces the touch sensitivity by approximately the square of the ratios, $$\frac{1 \text{ Mhz}}{5.5 \text{ Mhz}} \text{ and } \frac{3 \text{ Mhz}}{5.5 \text{ Mhz}},$$

which allows sealing compounds to be applied to the touch surface of a SAW touch panel without absorbing all of the energy so that the panels can still function. It is noted, that because the touch sensitivity of the SAW touch panel is reduced by 30 sensitivity of the SAW touch panel is reduced by 30 to 1 at 1 Mhz, it is important to maintain an adequate signal to noise ratio. In particular, the R.F. amplifier 151 should be shielded and high drive transducers and drive circuits must be used to ensure a substantial transmission of acoustic wave energy between the touch panel and the controller electronics. Further, at 1 Mhz, a variable height reflective array should be employed as opposed to a reflective array utilizing element withdrawal techniques. This is because, reflective arrays utilizing element withdrawal techniques have a reflective element spacing at the sparse end of the array of approximately one-half of an inch or the width of the array. Assuming that the array width is limited to a preset value, this is an impractical design. Further, as to panel thickness, at 1 Mhz the surface acoustic wave touch panel must be at least approximately one-half of an inch thick and at 3 Mhz, the panel thickness must be at least approximately 0.30 inches if crossover of the surface acoustic wave from the top touch surface of the touch panel to a bottom surface of the acoustic wave touch panel is to be avoided.

Many modifications and variations of the embodiment disclosed herein incorporating the present invention are possible in view of the above teachings. Thus it is to be understood that, within the scope of the appended claims, the invention may be practiced otherwise than as described hereinabove.

We claim:

1. A controller for an acoustic wave touch panel having a substrate, X axis transducer means for imparting acoustic waves into said substrate for propagation therein relative to an associated X axis, said X axis transducer means receiving acoustic waves incident thereto to generate an X axis signal representing sensed acoustic waves from which the position of a touch relative to said X axis can be determined and a Y axis transducer means for imparting acoustic waves into said substrate for propagation therein relative to an associated Y axis, said Y axis transducer means receiving acoustic waves incident thereto to generate a Y axis signal representing sensed acoustic waves from which the position of a touch relative to said Y axis can be determined, said controller comprising:

a signal conditioning circuit responsive to an X axis signal and a Y axis signal simultaneously received by said circuit for rejecting common modes from said signals to provide conditioned X axis and Y axis signals;

means for converting said conditioned X axis signal to a plurality of discrete X axis magnitude values, each value being associated with a position along said X axis, said converting means converting said conditioned Y axis signal to a plurality of discrete Y axis magnitude values, each value being associated with a position along said Y axis;

means for comparing each of a plurality of said X axis magnitude values to a reference X axis value associated with the same position with respect to said X axis as the position of said X axis magnitude value to provide an X-axis difference value representing the difference between said compared X axis values, said comparing means comparing each of a plurality of said Y axis magnitude values to a reference Y axis value associated with the same position with respect to said Y axis as the position of said Y axis magnitude value to provide a Y axis difference value representing the difference between said compared Y axis values; and means for determining the position of a touch from a plurality of X axis difference values associated with X axis positions within a given range of the X axis position along the X axis associated with a maximum X axis difference value and from a plurality of Y axis difference values associated with X axis positions within a given range of the X axis position associated with a maximum Y axis difference value.

2. A controller for an acoustic wave touch panel as recited in claim 1 wherein said touch position determining means includes a low pass filter for filtering a plurality of said X axis difference values within said range of said maximum X axis difference value and a plurality of said Y axis difference values within a range of said maximum Y axis difference values to provide respective X axis filtered values and Y axis filtered values; and a peak detector for detecting a peak of said X axis filtered values and a peak of said Y axis filtered values, said X axis peak and Y axis peak representing the position of a touch with respect to said X and Y axes.

3. A controller for an acoustic wave touch panel as recited in claim 1 including a touch pressure detector for detecting the pressure of a touch from said maximum X axis difference value and said maximum Y axis difference value.

4. A controller for an acoustic wave touch panel as recited in claim 3 wherein said touch pressure detector includes means for averaging said magnitudes of said maximum difference signals associated with said X and Y axes.

5. A controller for ant acoustic wave touch panel as recited in claim 1 wherein said signal conditioning circuit includes an amplifier with an adjustable gain and further including means for automatically adjusting the gain of said amplifier.

6. A controller for an acoustic wave touch panel as recited in claim 5 wherein said gain adjustment means includes means for comparing a difference value associated with a preselected position along the X axis to a gain reference value associated with said preselected position, said gain adjustment means adjusting said gain if said difference value is not within a given range of said gain reference value.

7. A controller for an acoustic wave touch panel as recited in claim 6 including means for automatically selecting said preselected position upon an initialization of said touch panel from the position of a maximum X axis difference value determined for an untouch panel.

8. A controller for an acoustic wave touch panel as recited in claim 6 including means for updating said X axis reference values if said gain is adjusted.

9. A controller for an acoustic wave touch panel as recited in claim 6 wherein said gain adjustment means includes means for comparing a difference value associated with a preselected position along the Y axis to a gain reference value associated with said preselected position, said gain adjustment means adjusting said gain for said Y axis if said difference value is not within a given range of said gain reference value.

10. A controller for an acoustic wave touch panel as recited in claim 9 including means for automatically selecting said preselected position upon an initialization of said touch panel from the position of a maximum Y axis difference value determined for an untouch panel.

11. A controller for an acoustic wave touch panel as recited in claim 9 including means for updating said Y axis reference values if said gain is adjusted.

12. A controller for an acoustic wave touch panel having a substrate, X axis transducer means for imparting acoustic waves into said substrate for propagation therein relative to an associated X axis, said X axis transducer means receiving acoustic waves incident thereto to generate an X axis signal representing sensed acoustic waves from which the position of a touch relative to said X axis can be determined and a Y axis transducer means for imparting acoustic waves into said substrate for propagation therein relative to an associated Y axis, said Y axis transducer means receiving acoustic waves incident thereto to generate a Y axis signal representing sensed acoustic waves from which the position of a touch relative to said Y axis can be determined, said controller comprising:

a signal conditioning circuit responsive to an X axis signal and a Y axis signal simultaneously received by said circuit for rejecting common modes from said signals to provide a conditioned X axis and Y axis signals, said circuit including an amplifier with an adjustable gain;

means for detecting the presence or absence of a touch from said conditioned X axis and Y axis signals;

means responsive to the detection of a touch for determining the position of said touch relative to said X and Y axes;

means operable in the absence of a recognized touch for determining from said conditioned X axis and Y axis signals whether the gain of said amplifier needs adjustment; and means for automatically adjusting the gain of said amplifier if needed.

13. A controller for an acoustic wave touch panel as recited in claim 12 wherein said touch position determining means includes a low pass filter for filtering said X axis and Y axis signals and a peak detector for detecting the peak of said X axis and Y axis filtered signals.

14. A controller as recited in claim 12 wherein said peak detector includes differentiator.

15. A touch position detector for an acoustic touch panel having a substrate and at least one transducer for imparting an acoustic wave into said substrate for propagation along a plurality of paths, each path representing a position along a first axis and for receiving an acoustic wave incident thereto to provide a signal representative of said wave, a touch on said substrate intersecting one of said paths forming a perturbation in said acoustic wave propagating along said path, comprising:

means for converting said signal to a plurality of discrete magnitude values each value being associated with a position with respect to said first axis;

means for comparing each of a plurality of said magnitude values to a reference value associated with the same position with respect to said first axis as the position of said magnitude value to provide a value representing the difference between said magnitude and reference values; and means for comparing a maximum difference value to a touch threshold to detect a touch on said substrate when said maximum difference is greater than said threshold; and means for determining the position of a touch from a plurality of difference values associated with positions with respect to said first axis within a given range of the first axis position associated with said maximum difference value.

16. A touch position detector for an acoustic touch panel as recited in claim 15 wherein said position determining means includes a low pass filter for filtering a plurality of said difference values within a given range of said maximum difference value; and a peak detector for detecting a peak of said filtered difference values, the position associated with said peak value representing the position of a touch relative to said first axis.

17. A touch position detector for an acoustic touch panel as recited in claim 12 wherein said low pass filter averages said difference values along a plurality of points within a given range of said maximum difference value.

18. A touch position detector for an acoustic touch panel as recited in claim 12 wherein said peak detector differentiates said filtered difference values.

19. A touch position detector for an acoustic touch panel as recited in claim 12 wherein said peak detector includes a sum of differences filter.

20. A touch position detector for an acoustic touch panel as recited in claim 15 including at least one transducer for imparting an acoustic wave into said substrate for propagation along a plurality of paths, each path representing a position along a second axis generally perpendicular to said first axis and for receiving an acoustic wave incident thereto to provide a signal representative thereof;

means for converting said signal to a plurality of discrete magnitude values each value corresponding to a position with respect to said second axis;

means for comparing each of said magnitude values to a reference value corresponding to the same position with respect to said second axis as the position of said magnitude value to provide a value representing the difference between said magnitude and reference values; and said comparing means comparing a maximum difference value associated with said first and second axes to a touch threshold to detect a touch on said substrate when said maximum values are greater than said threshold.

21. A touch position detector for an acoustic touch panel as recited in claim 15 including at least one transducer for imparting an acoustic wave into said substrate for propagation along a plurality of paths, each path representing a position with respect to a second axis generally perpendicular to said first axis and for receiving an acoustic wave incident thereto to provide a signal representative thereof;

means for converting said signal to a plurality of discrete magnitude values each value corresponding to a position with respect to said second axis;

means for comparing each of said magnitude values to a reference value corresponding to the same position with respect to said second axis as the position of said magnitude value to provide a value representing the difference between said magnitude and reference values; and means for determining a value representing the pressure of a touch from the magnitudes of a maximum difference signal associated with said first axis and a maximum difference signal associated with a second axis.

22. A controller for an acoustic wave touch panel as recited in claim 21 wherein said touch position determining means includes a low pass filter for filtering a plurality of said X axis difference values within said range of said maximum X axis difference value and a plurality of said Y axis difference values within a range of said maximum Y axis difference values to provide respective X axis filtered values and Y axis filtered values; and a peak detector for detecting a peak of said X axis filtered value and a peak of said Y axis filtered value, said X axis peak and Y axis peak representing the position of a touch with respect to said X and Y axes.

23. A touch position detector for an acoustic touch panel as recited in claim 15 wherein said touch panel includes an active touch area and an inactive touch area, said touch position detector detecting a touch only in said active touch area.

24. A touch position detector for an acoustic touch panel as recited in claim 23 wherein the size of said active area is variable.

25. A touch position detector for an acoustic touch panel as recited in claim 23 wherein the position of said active area is variable.

26. A touch position detector for an acoustic touch panel as recited in claim 15 including a touch position coordinate calculator responsive to said determined touch position for determining a value representative of a coordinate of a touch position relative to an origin position of said axis wherein said origin is variable.

27. A touch position detector for an acoustic touch panel as recited in claim 15 including means for storing a value representing a first detected touch position; means for comparing a value representing a subsequent detected touch position to said first position to determine whether said positions are within a predetermined distance from each other, said subsequent touch position being recognized as a new touch position only if said subsequent position is at a distance from said first position that is greater than said predetermined distance.

28. A touch position detector for an acoustic touch panel as recited in claim 27 wherein a touch position determined to be a new position is utilized by said comparing means as said first detected touch position for determining whether the next detected touch position is a new position.

29. A touch position detector for an acoustic touch panel as recited in claim 15 including means responsive to a predetermined number of detected touches for updating said reference values.

30. A touch position detector for an acoustic touch panel as recited in claim 15 including means for updating said reference values substantially periodically in the absence of a detected touch.

31. A touch position detector for an acoustic touch panel as recited in claim 15 wherein said touch threshold is variable.

32. A touch position detector for an acoustic touch panel having a substrate and at least one transducer for imparting an acoustic wave into said substrate for propagation along a plurality of paths, each path representing a position along a first axis and for receiving an acoustic wave incident thereto to provide a signal representative of said wave, a touch on said substrate intersecting one of said paths forming a perturbation in the acoustic wave propagating along said path comprising:
   a comparator for comparing said received acoustic wave signal to a reference signal to provide a signal representing the difference therebetween;
   a software low pass filter for filtering said difference signal to provide a filtered difference signal; and
   a software peak detector for detecting a peak of said filtered difference signal, said peak representing the position of said touch relative to said axis.

33. A touch position detector for an acoustic touch panel as recited in claim 32 wherein said reference signal represents a received acoustic wave propagating in said substrate with no touch intersecting said paths of propagation.

34. A touch position detector for an acoustic touch panel as recited in claim 32 including means for comparing said difference signal to a threshold value representing a minimum touch difference, said difference signal being filtered if the magnitude of said difference signal is greater than or equal to said threshold value.

35. A touch position detector for an acoustic touch panel as recited in claim 34 wherein said threshold value is variable.

36. A touch position detector for an acoustic touch panel as recited in claim 32 wherein said software low pass filter averages said difference signal along a plurality of points within a given range of a point along said signal representing a maximum difference.

37. A touch position detector for an acoustic touch panel as recited in claim 32 wherein said software peak detector differentiates said filtered difference signal.

38. A touch position detector for an acoustic touch panel as recited in claim 32 wherein said software peak detector includes a sum of differences filter.

39. A touch position detector for an acoustic touch panel as recited in claim 32 including at least one transducer for receiving and providing a signal representing acoustic waves incident thereto that propagate in said substrate along a plurality of paths each representing a position along a second axis, said second axis being generally perpendicular to said first axis and said paths representing said second axis intersecting said paths representing said first axis; and a touch pressure detector for determining the pressure of a touch intersecting a path representing said first axis and a path intersecting said second axis from the magnitude of a maximum difference signal associated with a received acoustic wave propagating along a path representing said first axis and from the magnitude of a maximum difference signal associated with a received acoustic wave propagating along a path representing a position along said second axis.

40. A touch position detector for an acoustic touch panel as recited in claim 39 wherein said touch pressure detector includes means for averaging said magnitudes of said maximum difference signals associated with said first and second axes.

41. A touch position detector for an acoustic touch panel as recited in claim 32 wherein said substrate includes an active touch area and an inactive touch area, said touch position detector applying to said software peak detector only signals representing positions within said active touch area.

42. A touch position detector for an acoustic touch panel as recited in claim 41 wherein the size of said active area is variable.

43. A touch position detector for an acoustic touch panel as recited in claim 41 wherein the position of said active area is variable.

44. A touch position detector for an acoustic touch panel as recited in claim 32 including a touch position coordinate calculator responsive to said detected peak for determining a value representative of a coordinate of a touch position relative to an origin position of said axis wherein said origin is variable.

45. A touch position detector for an acoustic touch panel as recited in claim 32 including means for storing a value representing a first detected touch position; means for comparing a value representing a subsequent detected touch position to said first position to determine whether said positions are within a predetermined distance from each other, said subsequent touch position being recognized as a new touch position only if said subsequent position is at a distance from said first position that is greater than said predetermined distance.

46. A touch position detector for an acoustic touch panel as recited in claim 7 wherein a touch position determined to be a new position is utilized by said comparing means as said first detected touch position for determining whether the next detected touch position is a new position.

47. A touch position detector for an acoustic touch panel as recited in claim 1 including means responsive to a predetermined number of detected touches for updating said reference signal.

48. A touch position detector for an acoustic touch panel as recited in claim 1 including means for updating said reference signal substantially periodically in the absence of a detected touch.

49. A surface acoustic wave touch panel system comprising:
   a touch panel substrate;
   X axis transducer means for imparting surface acoustic waves into said substrate for propagation therein relative to an associated X axis, said X axis transducer means receiving acoustic waves incident thereto to generate an X axis signal representing sensed surface acoustic waves from which the position of a touch relative to said X axis can be determined;

Y axis transducer means for imparting surface acoustic waves into said substrate for propagation therein relative to an associated Y axis, said Y axis transducer means receiving surface acoustic waves incident thereto to generate a Y axis signal representing sensed surface acoustic waves from which the position of a touch relative to said Y axis can be determined;

means for applying a drive signal to one of said X-axis or Y-axis transducer means to impart a surface acoustic wave in said substrate with respect to the axis associated with the driven transducer, said drive signal having a frequency sufficiently low so as to allow said touch panel substrate to be hermetically sealed; and differential means coupled to said X axis and Y axis transducer means for providing a signal representing the difference between simultaneously received X axis and Y axis signals, said difference signal corresponding to said sensed surface acoustic waves propagating relative to the axis associated with said one driven transducer.

50. A surface acoustic wave touch panel as recited in claim 49 wherein said frequency is between 1 and 3 Mhz.

51. A surface acoustic wave touch panel comprising:
a touch panel substrate;

X axis transducer means for imparting surface acoustic waves into said substrate for propagation therein relative to an associated X axis, said X axis transducer means receiving surface acoustic waves incident thereto to generate an X axis signal representing sensed surface acoustic waves from which the position of a touch relative to said X axis can be determined;

Y axis transducer means for imparting surface acoustic waves into said substrate for propagation therein relative to an associated Y axis, said Y axis transducer means receiving surface acoustic waves incident thereto to generate a Y axis signal representing sensed acoustic waves from which the position of a touch relative to said Y axis can be determined, said controller comprising:

means for applying a drive signal to one of said X-axis or Y-axis transducer means to impart a surface acoustic wave in said substrate with respect to the axis associated with the driven transducer, said drive signal having a frequency sufficiently low so as to allow said touch panel substrate to be hermetically sealed;

a signal conditioning circuit responsive to an X axis signal and a Y axis signal simultaneously received by said circuit for rejecting common modes from said signals to provide conditioned X axis and Y axis signals;

means for converting said conditioned X axis signal to a plurality of discrete X axis magnitude values, each value being associated with a position with respect to said X axis, said converting means converting said conditioned Y axis signal to a plurality of discrete Y axis magnitude values, each value being associated with a position with respect to said Y axis;

means for comparing each of a plurality of said X axis magnitude values to a reference X axis value associated with the same position with respect to said X axis as the position of said X axis magnitude value to provide an X-axis difference value representing the difference between said compared X axis values, said comparing means comparing each of a plurality of said Y axis magnitude values to a reference Y axis value associated with the same position with respect to said Y axis as the position of said Y axis magnitude value to provide a Y axis difference value representing the difference between said compared Y axis values; and means for determining the position of a touch from a plurality of X axis difference values and from a plurality of Y axis difference values.

52. A controller for an acoustic wave touch panel as recited in claim 51 wherein said touch position determining means includes a low pass filter for filtering a plurality of said X axis difference values within said range of said maximum X axis difference value and a plurality of said Y axis difference values within a range of said maximum Y axis difference values to provide respective X axis filtered values and Y axis filtered values; and a peak detector for detecting a peak of said X axis filtered values and a peak of said Y axis filtered values, said X axis peak and Y axis peak representing the position of a touch with respect to said X and Y axes.

53. A controller for an acoustic wave touch panel as recited in claim 51 including a touch pressure detector for detecting the pressure of a touch from said maximum X axis difference value and said maximum Y axis difference value.

54. A controller for an acoustic wave touch panel as recited in claim 53 wherein said touch pressure detector includes means for averaging said magnitudes of said maximum difference signals associated with said X and Y axes.

55. A controller for an acoustic wave touch panel as recited in claim 51 wherein said signal conditioning circuit includes an amplifier with an adjustable gain and further including means for automatically adjusting the gain of said amplifier.

56. A controller for an acoustic wave touch panel as recited in claim 55 wherein said gain adjustment means includes means for comparing a difference value associated with a preselected position with respect to the X axis to a gain reference value associated with said preselected position, said gain adjustment means adjusting said gain if said difference value is not within a given range of said gain reference value.

57. A controller for an acoustic wave touch panel as recited in claim 56 including means for automatically selecting said preselected position upon an initialization of said touch panel from the position of a maximum X axis difference value determined for an untouch panel.

58. A controller for an acoustic wave touch panel as recited in claim 56 including means for updating said X axis reference values if said gain is adjusted.

59. A controller for an acoustic wave touch panel as recited in claim 56 wherein said gain adjustment means includes means for comparing a difference value associated with a preselected position with respect to the Y axis to a gain reference value associated with said preselected position, said gain adjustment means adjusting said gain for said Y axis if said difference value is not within a given range of said gain reference value.

60. A controller for an acoustic wave touch panel as recited in claim 59 including means for automatically selecting said preselected position upon an initialization of said touch panel from the position of a maximum Y axis difference value determined for an untouch panel.

61. A controller for an acoustic wave touch panel as recited in claim 59 including means for updating said Y axis reference values if said gain is adjusted.

62. A surface acoustic wave touch panel comprising:
a touch panel substrate;
X axis transducer means for imparting surface acoustic waves into said substrate for propagation therein relative to an associated X axis, said X axis transducer means receiving surface acoustic waves incident thereto to generate an X axis signal representing sensed surface acoustic waves from which the position of a touch relative to said X axis can be determined;
Y axis transducer means for imparting surface acoustic waves into said substrate for propagation therein relative to an associated Y axis, said Y axis transducer means receiving surface acoustic waves incident thereto to generate a Y axis signal representing sensed acoustic waves from which the position of a touch relative to said Y axis can be determined, said controller comprising:
means for applying a drive signal to one of said X-axis or Y-axis transducer means to impart a surface acoustic wave in said substrate with respect to the axis associated with the driven transducer, said drive signal having a frequency sufficiently low so as to allow said touch panel substrate to be hermetically sealed;
a signal conditioning circuit responsive to an X axis signal and a Y axis signal simultaneously received by said circuit for rejecting common modes from said signals to provide conditioned X axis and Y axis signals;
means for detecting the presence or absence of a touch from said conditioned X axis and Y axis signals;
means responsive to the detection of a touch for determining the position of said touch relative to said X and Y axes;
means operable in the absence of a touch for determining from said conditioned X axis and Y axis signals whether the gain of said amplifier needs adjustment; and
means for automatically adjusting the gain of said amplifier if needed.

63. A controller for an acoustic wave touch panel as recited in claim 62 wherein said touch position determining means includes a low pass filter for filtering said X axis and Y axis signals and a peak detector for detecting the peak of said X axis and Y axis filtered signals.

64. A controller as recited in claim 62 wherein said peak detector includes a differentiator.

65. A surface acoustic wave touch panel as recited in claim 62 wherein said frequency is between 1 and 3 Mhz.

* * * * *